US012567996B2

(12) United States Patent (10) Patent No.: US 12,567,996 B2
Umeda et al. (45) Date of Patent: Mar. 3, 2026

(54) RELAY SYSTEM, TRANSMISSION DEVICE, RECEPTION DEVICE, AND SWITCHING METHOD

(71) Applicant: Sumitomo Electric Industries, Ltd., Osaka (JP)

(72) Inventors: Daisuke Umeda, Osaka (JP); Yasuhiro Takizawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 265 days.

(21) Appl. No.: 18/282,995

(22) PCT Filed: Dec. 24, 2021

(86) PCT No.: PCT/JP2021/048347
§ 371 (c)(1),
(2) Date: Sep. 20, 2023

(87) PCT Pub. No.: WO2022/201712
PCT Pub. Date: Sep. 29, 2022

(65) Prior Publication Data
US 2024/0154714 A1 May 9, 2024

(30) Foreign Application Priority Data
Mar. 26, 2021 (JP) ................................. 2021-053058

(51) Int. Cl.
*H04L 12/46* (2006.01)
*H04J 14/02* (2006.01)
(52) U.S. Cl.
CPC .............. *H04L 12/46* (2013.01); *H04J 14/02* (2013.01)
(58) Field of Classification Search
CPC ....... H04L 12/46; H04J 14/02; H04J 14/0212; H04J 14/0307; H04J 14/0209;
(Continued)

(56) References Cited

U.S. PATENT DOCUMENTS 5,859,718 A * 1/1999 Yamamoto ......... H04Q 11/0062
398/1
5,938,309 A * 8/1999 Taylor ................. H04J 14/0307
398/43
(Continued)

FOREIGN PATENT DOCUMENTS

JP H11-346191 A 12/1999
JP 2020061575 A * 4/2020 ....... G05B 19/41875
WO 2017/073547 A1 5/2017

OTHER PUBLICATIONS

Takizawa et al., "Wavelength Division Multiplexing Transmission Method for 5G Radio Access Networks to Achieve 40km Transmission", SEI Technical Review No. 197, Jul. 2020, pp. 43-46.
(Continued)

*Primary Examiner* — Hibret A Woldekidan
(74) *Attorney, Agent, or Firm* — XSENSUS LLP

(57) ABSTRACT
A relay system includes a transmission device and a reception device. The transmission device includes: a first optical transmitter that converts a first signal to a first optical signal having a transmission speed equal to that of the first signal, and transmits the first optical signal; a data separator that converts the first signal to a plurality of low-rate signals having a lower speed than the first signal; a plurality of second optical transmitters each capable of converting the low-rate signals to low-rate optical signals and transmitting the optical signals, and converting a second signal to a second optical signal having a transmission speed equal to that of the second signal and transmitting the optical signal; and a multiplexer that multiplexes a plurality of optical signals selected from among the first optical signal, the low-rate optical signals, and the second optical signal, and outputs a multiplexed optical signal.

10 Claims, 14 Drawing Sheets

(58) Field of Classification Search
CPC .............. H04B 10/291; H04B 10/2912; H04B
10/293; H04B 10/297; H04B 10/298;
H04B 10/29; H04B 10/40; H04B 10/43
See application file for complete search history.

(56) References Cited

U.S. PATENT DOCUMENTS

| | | | |
|---|---|---|---|
| 6,532,320 B1 * | 3/2003 | Kikuchi | H04L 25/14 |
| | | | 385/24 |
| 2004/0114638 A1 * | 6/2004 | Matsuura | H04J 3/1658 |
| | | | 370/537 |
| 2007/0077072 A1 * | 4/2007 | Kunimatsu | H04J 14/0227 |
| | | | 398/135 |
| 2009/0116839 A1 * | 5/2009 | Kikuchi | H04J 14/0307 |
| | | | 398/79 |
| 2010/0239263 A1 * | 9/2010 | Tokura | H04J 14/02216 |
| | | | 398/94 |
| 2018/0309563 A1 | 10/2018 | Hisano et al. | |
| 2020/0280370 A1 | 9/2020 | Frozenfar | |
| 2023/0396902 A1 * | 12/2023 | Yoshino | H04J 14/0307 |

OTHER PUBLICATIONS

Takizawa et al. "Wavelength Division Multiplexing Transmission
Method for 5G Radio Access Networks to Achieve 40km Trans-
mission", JETI, vol. 69, No. 3, Feb. 22, 2021, 6 pages.
International Search Report mailed on Mar. 8, 2022, received for
PCT Application PCT/JP2021/048347, filed on Dec. 24, 2021, 5
pages including English Translation.

* cited by examiner

1

RELAY SYSTEM, TRANSMISSION DEVICE, RECEPTION DEVICE, AND SWITCHING METHOD

CROSS-REFERENCE TO RELATED APPLICATIONS

The present application is based on PCT filing PCT/JP2021/048347, filed on Dec. 24, 2021, which claims priority from Japanese Patent Application No. 2021-053058, filed on Mar. 26, 2021, the entire contents of each are incorporated herein by reference.

TECHNICAL FIELD

The present disclosure relates to a relay system, a transmission device, a reception device, and a switching method.

BACKGROUND ART

Optical communication systems are sometimes used in mobile fronthaul (MFH), mobile midhaul (MMH), and mobile backhaul (MBH) that are included in mobile communication networks. For example, PATENT LITERATURE 1 discloses a relay transmission system, in MFH, using a PON (Passive Optical Network).

In applying an optical communication system to a mobile communication network, use of existing dark fibers is conceivable. For example, the length of MFH is generally less than 20 km. However, when dark fibers are used, extension of MFH to 30 km to 40 km is conceivable. Meanwhile, in eCPRI (enhanced CPRI) used in 5G (5th generation mobile communication system), use of 25.78125 Gbps communication (25G Ethernet, or hereinafter also referred to as "25GE"; "Ethernet" is a registered trademark) is prospected. In long-distance transmission using 25GE, deterioration of optical signal waveforms due to wavelength dispersion of optical fibers becomes a problem. NON-PATENT LITERATURE 1 discloses a transmission method in which a 25G Ethernet signal is divided into two channels of half-rate signals and transmitted to reduce the influence of wavelength dispersion.

CITATION LIST

Patent Literature

PATENT LITERATURE 1: International Publication No. WO2017/073547
PATENT LITERATURE 2: Japanese Laid-Open Patent Publication No. H11-346191

Non-Patent Literature

NON-PATENT LITERATURE 1: Yasuhiro Takizawa and two others, "Wavelength Division Multiplexing Transmission Method for 5G Radio Access", SEI technical review, Sumitomo Electric Industries, July 2020, No. 197, pp. 43-46

SUMMARY OF THE INVENTION

A relay system according to an aspect of the present disclosure is a system that relays communication between a first device and a second device. The relay system includes: a transmission device configured to receive an original signal transmitted from the first device, and transmit an optical signal according to the received original signal, and

2 a reception device configured to receive the optical signal transmitted from the transmission device, and transmit, to the second device, the original signal that is restored based on the received optical signal. The original signal includes at least one of a first signal subjected to error correction coding, and a second signal not subjected to error correction coding and having a lower speed than the first signal. The transmission device includes: a first receiver and a second receiver each configured to receive the original signal transmitted from the first device; a first full-rate transmission unit configured to output the original signal without changing a transmission speed of the original signal; a second full-rate transmission unit configured to output the second signal without changing a transmission speed of the second signal; a data separator configured to convert the first signal to a plurality of low-rate signals having a lower speed than the first signal; a first optical transmitter configured to convert the first signal to a first optical signal having a transmission speed equal to that of the first signal, and transmit the first optical signal; a plurality of second optical transmitters each configured to convert the low-rate signal or the second signal to an optical signal having a lower speed than the first optical signal, and transmit the optical signal; a first switching unit capable of switching connection between any of the first receiver and the second receiver, and any of the first full-rate transmission unit, the second full-rate transmission unit, and the data separator; a second switching unit capable of switching connection between any of the first full-rate transmission unit, the second full-rate transmission unit, and the data separator, and any of the first optical transmitter and the plurality of second optical transmitters; and a multiplexer configured to multiplex a plurality of optical signals transmitted from the first optical transmitter and the plurality of second optical transmitters, and transmit a multiplexed optical signal. The reception device includes: a demultiplexer configured to receive the multiplexed optical signal transmitted by the multiplexer, and convert the received multiplexed optical signal to the plurality of optical signals; a first optical receiver configured to convert the first optical signal generated by the demultiplexer to the first signal; a plurality of second optical receivers configured to convert an optical signal having a lower speed than the first optical signal generated by the demultiplexer to the low-rate signal or the second signal; a third full-rate transmission unit configured to output the original signal without changing the transmission speed of the original signal; a fourth full-rate transmission unit configured to output the second signal without changing the transmission speed of the second signal; a data coupler configured to restore the first signal, based on the plurality of low-rate signals; a first transmitter and a second transmitter each configured to transmit the original signal to the second device; a third switching unit capable of switching connection between any of the first optical receiver and the plurality of second optical receivers, and any of the third full-rate transmission unit, the fourth full-rate transmission unit, and the data coupler; and a fourth switching unit capable of switching connection between any of the third full-rate transmission unit, the fourth full-rate transmission unit, and the data coupler, and any of the first transmitter and the second transmitter. In a case where the original signal received by the first receiver is a first signal, and the original signal received by the second receiver is a first signal, the first switching unit connects the first receiver to the first full-rate transmission unit, and connects the second receiver to the data separator, the second switching unit connects the first full-rate transmission unit to the first optical transmitter, and connects the data separator to the second optical transmitters, the third switching unit connects the first optical receiver to the third full-rate transmission unit, and connects the second optical receivers to the data coupler, and the fourth switching unit connects the third full-rate transmission unit to the first transmitter, and connects the data coupler to the second transmitter. In a case where the original signal received by the first receiver is a first signal, and the original signal received by the second receiver is a second signal, the first switching unit connects the first receiver to the first full-rate transmission unit, and connects the second receiver to the second full-rate transmission unit, the second switching unit connects the first full-rate transmission unit to the first optical transmitter, and connects the second full-rate transmission unit to the second optical transmitter, the third switching unit connects the first optical receiver to the third full-rate transmission unit, and connects the second optical receiver to the fourth full-rate transmission unit, and the fourth switching unit connects the third full-rate transmission unit to the first transmitter, and connects the fourth full-rate transmission unit to the second transmitter. In a case where the original signal received by the first receiver is a second signal, and the original signal received by the second receiver is a second signal, the first switching unit connects the first receiver to the first full-rate transmission unit, and connects the second receiver to the second full-rate transmission unit, the second switching unit connects the first full-rate transmission unit to one optical transmitter out of the first optical transmitter and the plurality of second optical transmitters, and connects the second full-rate transmission unit to another optical transmitter out of the first optical transmitter and the plurality of second optical transmitters, the third switching unit connects one optical receiver out of the first optical receiver and the plurality of second optical receivers, to the third full-rate transmission unit, and connects another optical receiver out of the first optical receiver and the plurality of second optical receivers, to the fourth full-rate transmission unit, and the fourth switching unit connects the third full-rate transmission unit to the first transmitter, and connects the fourth full-rate transmission unit to the second transmitter.

A transmission device according to an aspect of the present disclosure is a transmission device that receives an optical signal from a first device, and transmits an optical signal according to the received original signal, the original signal including at least one of a first signal subjected to error correction coding, and a second signal not subjected to error correction coding and having a lower speed than the first signal. The transmission device includes: a first receiver and a second receiver each configured to receive the original signal transmitted from the first device; a first full-rate transmission unit configured to output the original signal without changing a transmission speed of the original signal; a second full-rate transmission unit configured to output the second signal without changing a transmission speed of the second signal; a data separator configured to convert the first signal to a plurality of low-rate signals having a lower speed than the first signal; a first optical transmitter configured to convert the first signal to a first optical signal having a transmission speed equal to that of the first signal, and transmit the first optical signal; a plurality of second optical transmitters each configured to convert the low-rate signal or the second signal to an optical signal having a lower speed than the first optical signal, and transmit the optical signal; a first switching unit capable of switching connection between any of the first receiver and the second receiver, and any of the first full-rate transmission unit, the second full-rate transmission unit, and the data separator; a second switching unit capable of switching connection between any of the first full-rate transmission unit, the second full-rate transmission unit, and the data separator, and any of the first optical transmitter and the second optical transmitters; and a multiplexer configured to multiplex a plurality of optical signals transmitted from the first optical transmitter and the plurality of second optical transmitters, and transmit a multiplexed optical signal. In a case where the original signal received by the first receiver is a first signal, and the original signal received by the second receiver is a first signal, the first switching unit connects the first receiver to the first full-rate transmission unit, and connects the second receiver to the data separator, and the second switching unit connects the first full-rate transmission unit to the first optical transmitter, and connects the data separator to the second optical transmitters. In a case where the original signal received by the first receiver is a first signal, and the original signal received by the second receiver is a second signal, the first switching unit connects the first receiver to the first full-rate transmission unit, and connects the second receiver to the second full-rate transmission unit, and the second switching unit connects the first full-rate transmission unit to the first optical transmitter, and connects the second full-rate transmission unit to the second optical transmitter. In a case where the original signal received by the first receiver is a second signal, and the original signal received by the second receiver is a second signal, the first switching unit connects the first receiver to the first full-rate transmission unit, and connects the second receiver to the second full-rate transmission unit, and the second switching unit connects the first full-rate transmission unit to one optical transmitter out of the first optical transmitter and the plurality of second optical transmitters, and connects the second full-rate transmission unit to another optical transmitter out of the first optical transmitter and the plurality of second optical transmitters.

A reception device according to an aspect of the present disclosure is a reception device that receives a multiplexed optical signal generated based on an original signal including at least one of a first signal subjected to error correction coding, and a second signal not subjected to error correction coding and having a lower speed than the first signal, and transmits, to a second device, the original signal restored based on the received multiplexed optical signal. The reception device includes: a demultiplexer configured to receive the multiplexed optical signal, and convert the received multiplexed optical signal to a plurality of optical signals; a first optical receiver configured to convert the first optical signal generated by the demultiplexer to the first signal; a plurality of second optical receivers configured to convert an optical signal having a lower speed than the first optical signal generated by the demultiplexer to the low-rate signal or the second signal; a third full-rate transmission unit configured to output the original signal without changing the transmission speed of the original signal; a fourth full-rate transmission unit configured to output the second signal without changing the transmission speed of the second signal; a data coupler configured to restore the first signal, based on the plurality of low-rate signals; a first transmitter and a second transmitter each configured to transmit the original signal to the second device; a third switching unit capable of switching connection between any of the first optical receiver and the second optical receivers, and any of the third full-rate transmission unit, the fourth full-rate transmission unit, and the data coupler; and a fourth switching unit capable of switching connection between any of the third full-rate transmission unit, the fourth full-rate transmission unit, and the data coupler, and any of the first transmitter and the second transmitter. In a case where an optical signal received by the first optical receiver is the first optical signal, and an optical signal received by the second optical receiver is a low-rate optical signal obtained by converting the low-rate signal, the third switching unit connects the first optical receiver to the third full-rate transmission unit, and connects the second optical receivers to the data coupler, and the fourth switching unit connects the third full-rate transmission unit to the first transmitter, and connects the data coupler to the second transmitter. In a case where an optical signal received by the first optical receiver is the first optical signal, and an optical signal received by the second optical receiver is a second optical signal obtained by converting the second signal, the third switching unit connects the first optical receiver to the third full-rate transmission unit, and connects the second optical receiver to the fourth full-rate transmission unit, and the fourth switching unit connects the third full-rate transmission unit to the first transmitter, and connects the fourth full-rate transmission unit to the second transmitter. In a case where an optical signal received by the first optical receiver is the second optical signal, and an optical signal received by the second optical receiver is the second optical signal, the third switching unit connects one optical receiver out of the first optical receiver and the plurality of second optical receivers, to the third full-rate transmission unit, and connects another optical receiver out of the first optical receiver and the plurality of second optical receivers, to the fourth full-rate transmission unit, and the fourth switching unit connects the third full-rate transmission unit to the first transmitter, and connects the fourth full-rate transmission unit to the second transmitter.

A switching method according to an aspect of the present disclosure is a switching method for switching setting of the transmission device. The method includes: operating the first switching unit to switch connection between any of the first receiver and the second receiver, and any of the first full-rate transmission unit, the second full-rate transmission unit, and the data separator; and operating the second switching unit to switch connection between any of the first full-rate transmission unit, the second full-rate transmission unit, and the data separator, and any of the first optical transmitter and the second optical transmitters.

A switching method according to an aspect of the present disclosure is a switching method for switching setting of the reception device. The method includes: operating the third switching unit to switch connection between any of the first optical receiver and the second optical receivers, and any of the third full-rate transmission unit, the fourth full-rate transmission unit, and the data coupler; and operating the fourth switching unit to switch connection between any of the third full-rate transmission unit, the fourth full-rate transmission unit, and the data coupler, and any of the first transmitter and the second transmitter.

The present disclosure can be realized not only as a transmission device having such a characteristic configuration as described above, but also as a transmission method having, as steps, characteristic processes in the transmission device, a computer program for causing a computer to execute the steps, and a switching method for switching setting of the transmission device. The present disclosure can be realized not only as a reception device having such a characteristic configuration as described above, but also as a reception method having, as steps, characteristic processes in the reception device, a computer program for causing a computer to execute the steps, and a switching method for switching setting of the reception device. Furthermore, a part or the entirety of the transmission device can be realized as a semiconductor integrated circuit, and a part or the entire of the reception device can be realized as a semiconductor integrated circuit. Moreover, the present disclosure can be realized as a relay system including the transmission device and the reception device.

DETAILED DESCRIPTION

Figure 1:
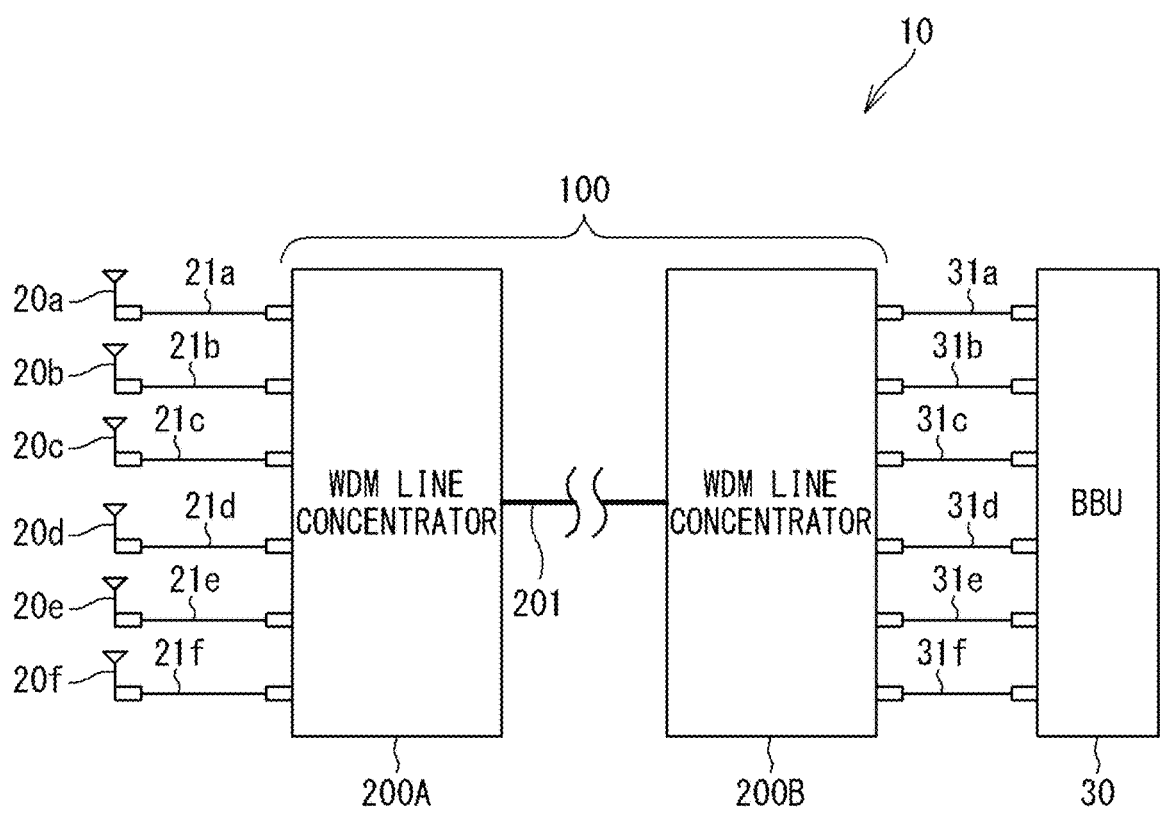
FIG. 1 is a schematic diagram showing an example of a configuration of a communication system according to an embodiment.

Problems to be Solved by the Present Disclosure

In 5G, not only 25GE but also 9.8304 Gbps communication defined in CPRI (Common Public Radio Interface) is sometimes performed. Furthermore, there is a need for coexistence between 5G and 4G (4th generation mobile communication system). In CPRI used for 4G, not only 9.8304 Gbps (hereinafter also referred to as "9.8 Gbps") but also 1.2288 Gbps (hereinafter also referred to as "1.2 Gbps"), 2.4576 Gbps (hereinafter also referred to as "2.4 Gbps"), and 4.9152 Gbps (hereinafter also referred to as "4.9

Gbps") are defined as data rates. However, in PATENT LITERATURE 1 and NON-PATENT LITERATURE 1 described above, how to cope with such multiple rates is not considered.

Effect of the Present Disclosure

The present disclosure can cope with multiple rates in a mobile communication network.

Outline of Embodiment of the Present Disclosure

Hereinafter, outlines of embodiments of the present disclosure are listed and described.

(1) A relay system according to the present embodiment is a system that relays communication between a first device and a second device. The relay system includes: a transmission device configured to receive an original signal transmitted from the first device, and transmit an optical signal according to the received original signal; and a reception device configured to receive the optical signal transmitted from the transmission device, and transmit, to the second device, the original signal that is restored based on the received optical signal. The original signal includes at least one of a first signal subjected to error correction coding, and a second signal not subjected to error correction coding and having a lower speed than the first signal. The transmission device includes: a first receiver and a second receiver each configured to receive the original signal transmitted from the first device; a first full-rate transmission unit configured to output the original signal without changing a transmission speed of the original signal; a second full-rate transmission unit configured to output the second signal without changing a transmission speed of the second signal; a data separator configured to convert the first signal to a plurality of low-rate signals having a lower speed than the first signal; a first optical transmitter configured to convert the first signal to a first optical signal having a transmission speed equal to that of the first signal, and transmit the first optical signal; a plurality of second optical transmitters each configured to convert the low-rate signal or the second signal to an optical signal having a lower speed than the first optical signal, and transmit the optical signal; a first switching unit capable of switching connection between any of the first receiver and the second receiver, and any of the first full-rate transmission unit, the second full-rate transmission unit, and the data separator; a second switching unit capable of switching connection between any of the first full-rate transmission unit, the second full-rate transmission unit, and the data separator, and any of the first optical transmitter and the plurality of second optical transmitters; and a multiplexer configured to multiplex a plurality of optical signals transmitted from the first optical transmitter and the plurality of second optical transmitters, and transmit a multiplexed optical signal. The reception device includes: a demultiplexer configured to receive the multiplexed optical signal transmitted by the multiplexer, and convert the received multiplexed optical signal to the plurality of optical signals; a first optical receiver configured to convert the first optical signal generated by the demultiplexer to the first signal; a plurality of second optical receivers configured to convert an optical signal having a lower speed than the first optical signal generated by the demultiplexer to the low-rate signal or the second signal; a third full-rate transmission unit configured to output the original signal without changing the transmission speed of the original signal; a fourth full-rate transmission unit configured to output the second signal without changing the transmission speed of the second signal; a data coupler configured to restore the first signal, based on the plurality of low-rate signals; a first transmitter and a second transmitter each configured to transmit the original signal to the second device; a third switching unit capable of switching connection between any of the first optical receiver and the plurality of second optical receivers, and any of the third full-rate transmission unit, the fourth full-rate transmission unit, and the data coupler; and a fourth switching unit capable of switching connection between any of the third full-rate transmission unit, the fourth full-rate transmission unit, and the data coupler, and any of the first transmitter and the second transmitter. In a case where the original signal received by the first receiver is a first signal, and the original signal received by the second receiver is a first signal, the first switching unit connects the first receiver to the first full-rate transmission unit, and connects the second receiver to the data separator, the second switching unit connects the first full-rate transmission unit to the first optical transmitter, and connects the data separator to the second optical transmitters, the third switching unit connects the first optical receiver to the third full-rate transmission unit, and connects the second optical receivers to the data coupler, and the fourth switching unit connects the third full-rate transmission unit to the first transmitter, and connects the data coupler to the second transmitter. In a case where the original signal received by the first receiver is a first signal, and the original signal received by the second receiver is a second signal, the first switching unit connects the first receiver to the first full-rate transmission unit, and connects the second receiver to the second full-rate transmission unit, the second switching unit connects the first full-rate transmission unit to the first optical transmitter, and connects the second full-rate transmission unit to the second optical transmitter, the third switching unit connects the first optical receiver to the third full-rate transmission unit, and connects the second optical receiver to the fourth full-rate transmission unit, and the fourth switching unit connects the third full-rate transmission unit to the first transmitter, and connects the fourth full-rate transmission unit to the second transmitter. In a case where the original signal received by the first receiver is a second signal, and the original signal received by the second receiver is a second signal, the first switching unit connects the first receiver to the first full-rate transmission unit, and connects the second receiver to the second full-rate transmission unit, the second switching unit connects the first full-rate transmission unit to one optical transmitter out of the first optical transmitter and the plurality of second optical transmitters, and connects the second full-rate transmission unit to another optical transmitter out of the first optical transmitter and the plurality of second optical transmitters, the third switching unit connects one optical receiver out of the first optical receiver and the plurality of second optical receivers, to the third full-rate transmission unit, and connects another optical receiver out of the first optical receiver and the plurality of second optical receivers, to the fourth full-rate transmission unit, and the fourth switching unit connects the third full-rate transmission unit to the first transmitter, and connects the fourth full-rate transmission unit to the second transmitter. Thus, the transmission device can convert the first signal to the first optical signal, convert the first signal to the plurality of low-rate optical signals, convert the second signal to the second optical signal, and multiplex the converted optical signals to transmit a multiplexed optical signal. The reception device can receive the multiplexed optical signal, restore the first optical signal to the first signal, restore the plurality of low-rate signals to the first signal, and restore the second optical signal to the second signal. Therefore, it is possible to cope with the multiple rates in the mobile communication network.

(2) In a case where the original signal received by the first receiver is a second signal, and the original signal received by the second receiver is a second signal, the second switching unit may connect the first full-rate transmission unit to one of the second optical transmitters, and connect the second full-rate transmission unit to another one of the second optical transmitters, and the third switching unit may connect one of the second optical receivers to the second full-rate transmission unit, and connect another one of the second optical receivers to the fourth full-rate transmission unit. Thus, when the low-speed second signal is received by each of the first receiver and the second receiver, the second signal can be efficiently transmitted optically.

(3) The first full-rate transmission unit may output the original signal in synchronization with an output timing of the data separator, and the third full-rate transmission unit may output the original signal in synchronization with an output timing of the data coupler. Since the output timing of the original signal from the first full-rate transmission unit coincides with the output timing of the low-rate signal from the data separator, multiplexing of the optical signals is facilitated. Since the output timing of the original signal from the third full-rate transmission unit coincides with the output timing of the data coupler, the restored original signal is outputted at an appropriate timing.

(4) The first full-rate transmission unit may detect a boundary of a plurality of blocks included in the original signal, and output the blocks after holding the blocks during a delay time for synchronization with the output timing of the data separator. The third full-rate transmission unit may detect a boundary of the plurality of blocks included in the original signal, and output the blocks after holding the blocks during a delay time for synchronization with the output timing of the data coupler. This allows synchronization of the output timings of the first full-rate transmission unit and the data separator, and synchronization of the output timings of the third full-rate transmission unit and the data coupler.

(5) In the case where the original signal received by the second receiver is a first signal, the second full-rate transmission unit may be invalidated. In the case where the original signal received by the second receiver is a second signal, the data separator may be invalidated. Thus, unused units in the transmission device can be invalidated according to the original signal received by the second receiver.

(6) In the case where the original signal received by the second receiver is a first signal, the second optical receiver may convert the optical signal to the low-rate signal, and the fourth full-rate transmission unit may be invalidated. In the case where the original signal received by the second receiver is a second signal, the second optical receiver may convert the optical signal to the second signal, and the data coupler may be invalidated. Thus, unused units in the reception device can be invalidated according to the original signal received by the second receiver.

(7) A transmission device according to the present embodiment is a transmission device that receives an optical signal from a first device, and transmits an optical signal according to the received original signal, the original signal including at least one of a first signal subjected to error correction coding, and a second signal not subjected to error correction coding and having a lower speed than the first signal. The transmission device includes: a first receiver and a second receiver each configured to receive the original signal transmitted from the first device; a first full-rate transmission unit configured to output the original signal without changing a transmission speed of the original signal; a second full-rate transmission unit configured to output the second signal without changing a transmission speed of the second signal; a data separator configured to convert the first signal to a plurality of low-rate signals having a lower speed than the first signal; a first optical transmitter configured to convert the first signal to a first optical signal having a transmission speed equal to that of the first signal, and transmit the first optical signal; a plurality of second optical transmitters each configured to convert the low-rate signal or the second signal to an optical signal having a lower speed than the first optical signal, and transmit the optical signal; a first switching unit capable of switching connection between any of the first receiver and the second receiver, and any of the first full-rate transmission unit, the second full-rate transmission unit, and the data separator; a second switching unit capable of switching connection between any of the first full-rate transmission unit, the second full-rate transmission unit, and the data separator, and any of the first optical transmitter and the second optical transmitters; and a multiplexer configured to multiplex a plurality of optical signals transmitted from the first optical transmitter and the plurality of second optical transmitters, and transmit a multiplexed optical signal. In a case where the original signal received by the first receiver is a first signal, and the original signal received by the second receiver is a first signal, the first switching unit connects the first receiver to the first full-rate transmission unit, and connects the second receiver to the data separator, and the second switching unit connects the first full-rate transmission unit to the first optical transmitter, and connects the data separator to the second optical transmitters. In a case where the original signal received by the first receiver is a first signal, and the original signal received by the second receiver is a second signal, the first switching unit connects the first receiver to the first full-rate transmission unit, and connects the second receiver to the second full-rate transmission unit, and the second switching unit connects the first full-rate transmission unit to the first optical transmitter, and connects the second full-rate transmission unit to the second optical transmitter. In a case where the original signal received by the first receiver is a second signal, and the original signal received by the second receiver is a second signal, the first switching unit connects the first receiver to the first full-rate transmission unit, and connects the second receiver to the second full-rate transmission unit, and the second switching unit connects the first full-rate transmission unit to one optical transmitter out of the first optical transmitter and the plurality of second optical transmitters, and connects the second full-rate transmission unit to another optical transmitter out of the first optical transmitter and the plurality of second optical transmitters. Thus, the transmission device can convert the first signal to the first optical signal, convert the first signal to the plurality of low-rate optical signals, convert the second signal to the second optical signal, and multiplex the converted optical signals to transmit a multiplexed optical signal. Therefore, it is possible to cope with the multiple rates in the mobile communication network. Since the second signal is transmitted by using the low-speed second optical transmitter, a power budget higher than that of a high-speed optical transmitter can be ensured. Furthermore, since some of the first signals can be transmitted by using the plurality of second optical transmitters, the number of the first optical transmitters can be reduced.

(8) A reception device according to the present embodiment is a reception device that receives a multiplexed optical signal generated based on an original signal including at least one of a first signal subjected to error correction coding, and a second signal not subjected to error correction coding and having a lower speed than the first signal, and transmits, to a second device, the original signal restored based on the received multiplexed optical signal. The reception device includes: a demultiplexer configured to receive the multiplexed optical signal, and convert the received multiplexed optical signal to a plurality of optical signals; a first optical receiver configured to convert the first optical signal generated by the demultiplexer to the first signal; a plurality of second optical receivers configured to convert an optical signal having a lower speed than the first optical signal generated by the demultiplexer to the low-rate signal or the second signal; a third full-rate transmission unit configured to output the original signal without changing the transmission speed of the original signal; a fourth full-rate transmission unit configured to output the second signal without changing the transmission speed of the second signal; a data coupler configured to restore the first signal, based on the plurality of low-rate signals; a first transmitter and a second transmitter each configured to transmit the original signal to the second device; a third switching unit capable of switching connection between any of the first optical receiver and the second optical receivers, and any of the third full-rate transmission unit, the fourth full-rate transmission unit, and the data coupler; and a fourth switching unit capable of switching connection between any of the third full-rate transmission unit, the fourth full-rate transmission unit, and the data coupler, and any of the first transmitter and the second transmitter. In a case where an optical signal received by the first optical receiver is the first optical signal, and an optical signal received by the second optical receiver is a low-rate optical signal obtained by converting the low-rate signal, the third switching unit connects the first optical receiver to the third full-rate transmission unit, and connects the second optical receivers to the data coupler, and the fourth switching unit connects the third full-rate transmission unit to the first transmitter, and connects the data coupler to the second transmitter. In a case where an optical signal received by the first optical receiver is the first optical signal, and an optical signal received by the second optical receiver is a second optical signal obtained by converting the second signal, the third switching unit connects the first optical receiver to the third full-rate transmission unit, and connects the second optical receiver to the fourth full-rate transmission unit, and the fourth switching unit connects the third full-rate transmission unit to the first transmitter, and connects the fourth full-rate transmission unit to the second transmitter. In a case where an optical signal received by the first optical receiver is the second optical signal, and an optical signal received by the second optical receiver is the second optical signal, the third switching unit connects one optical receiver out of the first optical receiver and the plurality of second optical receivers, to the third full-rate transmission unit, and connects another optical receiver out of the first optical receiver and the plurality of second optical receivers, to the fourth full-rate transmission unit, and the fourth switching unit connects the third full-rate transmission unit to the first transmitter, and connects the fourth full-rate transmission unit to the second transmitter. Thus, the reception device can receive the multiplexed optical signal, restore the first optical signal to the first signal, restore the plurality of low-rate signals to the first signal, and restore the second optical signal to the second signal. Therefore, it is possible to cope with the multiple rates in the mobile communication network.

(9) One switching method according to the present embodiment is a switching method for switching setting of the transmission device described in the above (1). The method includes: operating the first switching unit to switch connection between any of the first receiver and the second receiver, and any of the first full-rate transmission unit, the second full-rate transmission unit, and the data separator; and operating the second switching unit to switch connection between any of the first full-rate transmission unit, the second full-rate transmission unit, and the data separator, and any of the first optical transmitter and the second optical transmitters. Thus, regardless of which of the first signal and the second signal is given as the original signal, the original signal can be converted to an appropriate optical signal to be transmitted by appropriately setting the first switching unit and the second switching unit.

(10) Another switching method according to the present embodiment is a switching method for switching setting of the reception device described in the above (1). The method includes: operating the third switching unit to switch connection between any of the first optical receiver and the second optical receivers, and any of the third full-rate transmission unit, the fourth full-rate transmission unit, and the data coupler; and operating the fourth switching unit to switch connection between any of the third full-rate transmission unit, the fourth full-rate transmission unit, and the data coupler, and any of the first transmitter and the second transmitter. Thus, regardless of which of the first optical signal, the second optical signal, and the low-rate optical signal is transmitted from the transmission device, the transmitted signal can be restored to an appropriate original signal by appropriately setting the third switching unit and the fourth switching unit.

Details of Embodiments of the Present Disclosure

Hereinafter, embodiments of the present disclosure will be described in detail with reference to the drawings. At least some parts of the embodiments described below may be combined together as desired.

[1. Configuration of Relay System]

FIG. 1 is a schematic diagram showing an example of a configuration of a communication system 10 according to the present embodiment. The communication system 10 shown in FIG. 1 is a mobile fronthaul system. The communication system 10 includes remote radio heads (hereinafter referred to as "RRH") 20a, 20b, 20c, 20d, 20e, 20f, and a base band unit (hereinafter referred to as "BBU") 30. The RRHs 20a. 20b, 20c, 20d, 20e, 20f are antennas of radio base stations. The communication system 10 according to the present embodiment includes a first base station and a second base station that are not shown. The RRHs 20a, 20c, 20e are antennas for the first base station, and RRHs 20b, 20d, 20f are antennas for the second base station. The BBU 30 is a signal processing unit for the radio base stations. A plurality of (six in the example of FIG. 1) RRHs 20a, 20b, 20c, 20d, 20e, 20f are connected to the single BBU 30. Hereinafter, the RRHs 20a, 20b, 20c, 20d, 20e, 20f may also be referred to as "RRH 20".

The communication system 10 includes a relay system 100 between the RRH 20 and the BBU 30. The relay system 100 relays communication between the RRH 20 and the BBU 30. In the present embodiment, the relay system 100 is applied to MFH. However, the present disclosure is not limited thereto. The relay system 100 may be applied to MBH or MMH.

The relay system 100 includes WDM concentrators 200A, 200B. The WDM concentrator 200A is connected to the six RRHs 20a. 20b, 20c, 20d, 20e, 20f via six optical fiber cables 21a, 21b, 21c, 21d, 21e, 21f, respectively. The WDM concentrator 200B is connected to the BBU 30 via six optical fiber cables 31a, 31b, 31c, 31d, 31e, 31f The WDM concentrators 200A and 200B are connected to each other via a single optical fiber cable 201. The optical fiber cable 201 has a length of 20 km or more, for example. For example, dark fibers are used for the optical fiber cable 201. Hereinafter, the optical fiber cables 21a, 21b, 21c, 21d, 21e, 21f may be collectively referred to as "optical fiber cable 21", and the optical fiber cables 31a, 31b, 31c, 31d, 31e, 31f may be collectively referred to as "optical fiber cable 31".

[2. Transmission Device]

Figure 2A:
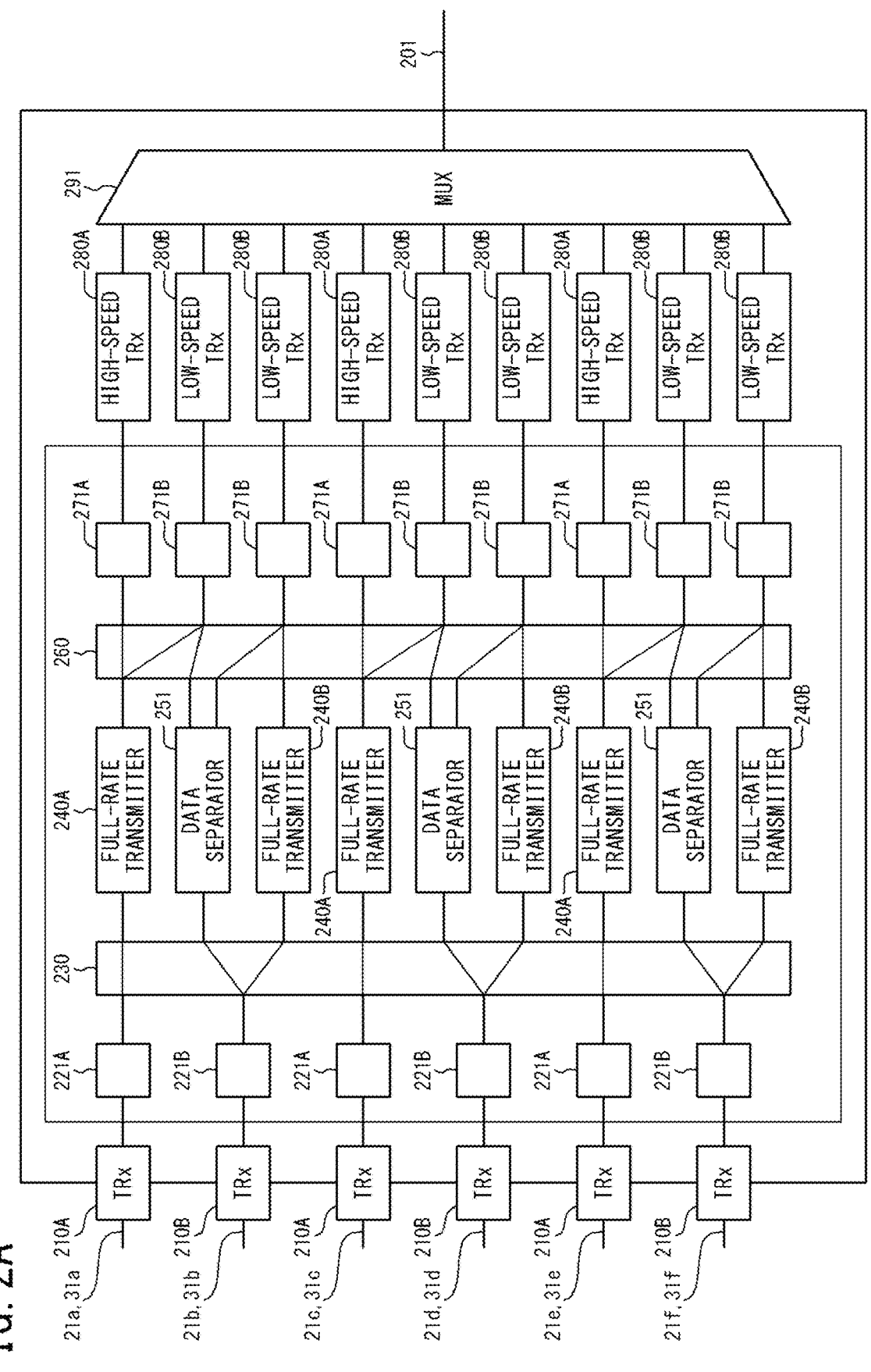
FIG. 2A is a block diagram showing an example of a configuration of a WDM concentrator serving as a transmission device.
Figure 2B:
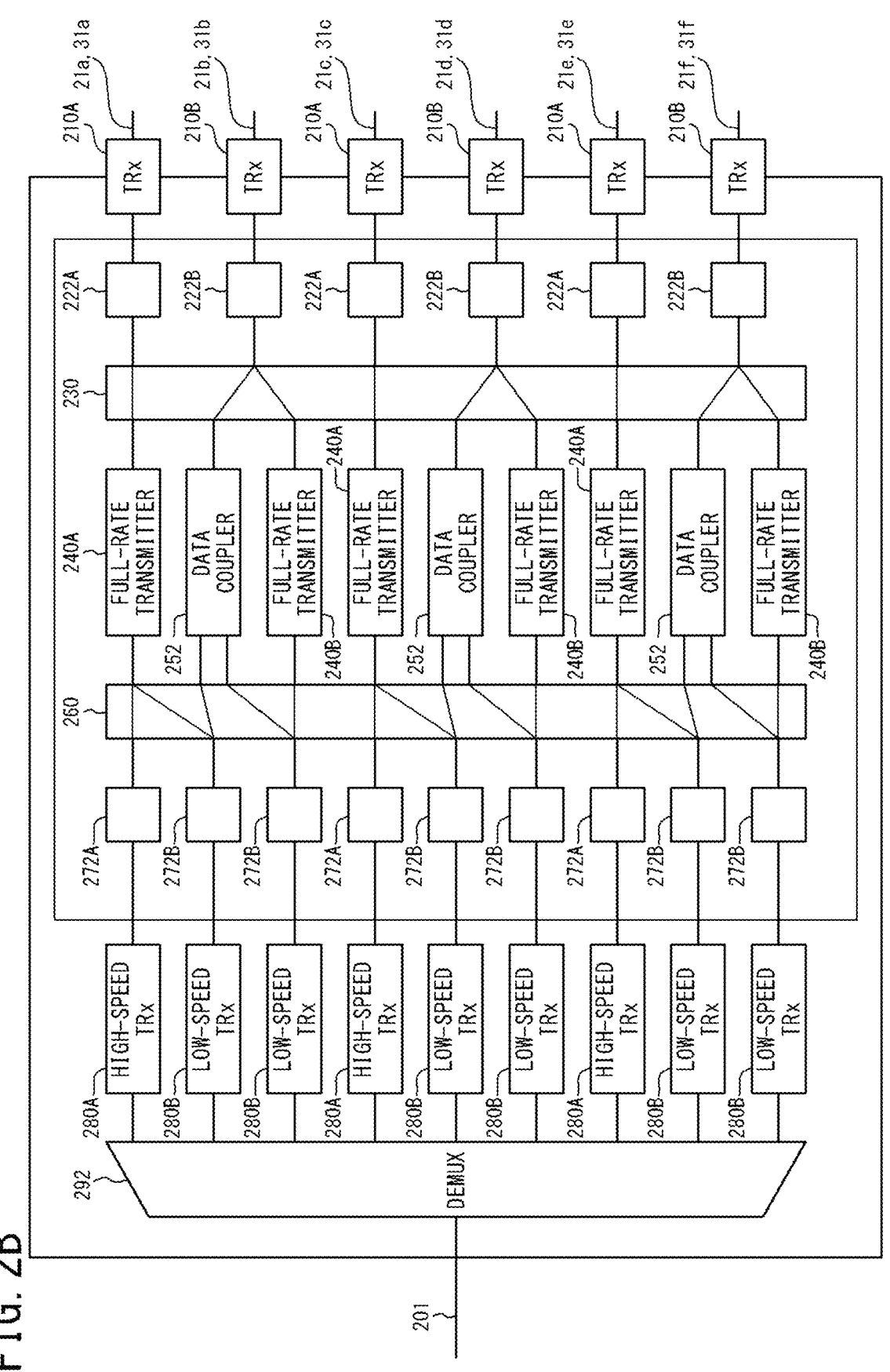
FIG. 2B is a block diagram showing an example of a configuration of a WDM concentrator serving as a reception device.

FIG. 2A and FIG. 2B are block diagrams each showing an example of a configuration of a WDM concentrator according to the present embodiment. FIG. 2A shows a configuration example of the WDM concentrator serving as a transmission device, and FIG. 2B shows a configuration example of the WDM concentrator serving as a reception device. The WDM concentrators 200A and 200B have the same configuration. In the following description, the WDM concentrators 200A and 200B are also collectively referred to as "WDM concentrator 200". The WDM concentrator 200 serves as a transmission device and a reception device. In FIG. 2A and FIG. 2B, the signal transmission direction is the rightward direction. Hereinafter, the configuration of the WDM concentrator as a transmission device will be described.

In the case where the WDM concentrator 200 serves as a transmission device, as shown in FIG. 2A, the WDM concentrator 200 includes six optical transceivers 210A, 210B, six serial/parallel converters 221A, 221B, one first switching unit 230, six full-rate transmission units 240A, 240B, three data separators 251, one second switching unit 260, nine parallel/serial converters 271A, 271B, three high-speed optical transceivers 280A, six low-speed optical transceivers 280B, and one multiplexer 291.

The optical transceivers 210A, 210B, 280A, 280B each perform mutual conversion between an optical signal and an electric signal. That is, the optical transceivers 210A, 210B, 280A, 280B each convert an inputted optical signal to an electric signal to be outputted, and converts an inputted electric signal to an optical signal to be outputted. Each of the optical transceivers 210A, 210B, 280A, 280B is an optical transmitter and is also an optical receiver. An optical transmitter converts an inputted electric signal to an optical signal having a predetermined wavelength, and outputs the optical signal. An optical receiver converts an inputted optical signal to an electric signal, and outputs the electric signal.

The optical transceivers 210A, 210B, and 280A are 25GE compatible optical transceivers. RS-FEC (Reed-Solomon Forward Error Correction) coded data conforming to eCPRI (hereinafter also referred to as "eCPRI signal") is transmitted from the RRH 20 by 25GE, or data conforming to CPRI (hereinafter also referred to as "CPRI signal") is transmitted from the RRH 20 at 9.8 Gbps. The CPRI signal is a signal not subjected to error correction coding. The optical transceivers 210A, 210B, and 280A conform to 25GBASE-LR defined in IEEE 802.3. The optical transceivers 210A, 210B, and 280A each receive an eCPRI optical signal being a serial signal, convert the received signal to a serial electric signal (eCPRI signal), and output the serial electric signal. The eCPRI signals outputted from the optical transceivers 210A, 210B, and 280A have a transmission speed of 25.8 Gbps.

The optical transceivers 210A, 210B, and 280A are compatible not only with 25GE but also with 9.8 Gbps, 1.2 Gbps, 2.4 Gbps, and 4.9 Gbps communications defined in CPRI. The optical transceiver 280B is compatible with 9.8 Gbps, 1.2 Gbps, 2.4 Gbps, and 4.9 Gbps communications, but is not compatible with 25GE. As long as it is compatible with 25GE and 12.9 Gbps that is half the rate of 25GE, the optical transceiver 280A may not necessarily be compatible with 9.8 Gbps, 1.2 Gbps, 2.4 Gbps, and 4.9 Gbps communications.

Each of the full-rate transmission units 240A, 240B and the data separator 251 is a signal processing circuit. Each of the full-rate transmission units 240A, 240B and the data separators 251 is, for example, a logic circuit device designed to be capable of specific information processing, and includes at least one of an ASIC (Application Specific Integrated Circuit) and an FPGA (Field Programmable Gate Array).

The full-rate transmission units 240A, 240B each output a received signal without changing the transmission speed of the signal. The data separators 251 converts the received signal to a plurality of low-rate signals having a lower speed than the received signal. Specifically, the data separator 251 converts a 25GE signal to two low-rate signals having half the communication speed of the 25GE signal.

The WDM concentrator 200A will be described. Each of the optical transceivers 210A, 210B is connected to the RRH 20 via the optical fiber cable 21 (see FIG. 1). Two optical transceivers 210A, 210B, two serial/parallel converters 221A, 221B, two full-rate transmission units 240A, 240B, one data separator 251, three parallel/serial converters 271A. 271B, one high-speed optical transceiver 280A, and two low-speed optical transceivers 280B correspond to two RRHs 20.

A case where an original signal transmitted from one RRH 20 is given to an optical transceiver 210A is considered. The original signal being a serial signal received by the optical transceiver 210A is given to the serial/parallel converter 221A. The serial/parallel converter 221A extracts clock data from the original signal being a serial signal, performs timing reproduction, and converts serial data to parallel data (hereinafter referred to as "reproduction data") at a clock rate according to the original signal (e.g., 25.8 Gbps clock rate for a 25.8 Gbps eCPRI signal, or 9.8 Gbps clock rate for a 9.8 Gbps CPRI signal). The 25.8 Gbps clock rate means, for example, 25.8/66 GHz for the case of 66-bit parallel data.

The reproduction data is given to the full-rate transmission unit 240A. The full-rate transmission unit 240A outputs the given reproduction data without changing the transmission speed.

The second switching unit 260 can switch the destination of the output of the full-rate transmission unit 240A, between the parallel/serial converters 271A and 271B. When the original signal is a 25.8 Gbps eCPRI signal, the destination of the output of the full-rate transmission unit 240A is set to the parallel/serial converter 271A to which the high-speed optical transceiver 280A is connected. When the original signal is a 9.8 Gbps CPRI signal, the destination of the output of the full-rate transmission unit 240A is set to the parallel/serial converter 271B to which the low-speed optical transceiver 280B is connected.

The parallel/serial converter 271A or 271B converts the reproduction data being a parallel signal to a serial signal, and outputs the serial signal to the high-speed optical transceiver 280A or the low-speed optical transceiver 280B.

Simultaneously with the transmission of the original signal from the RRH 20, the original signal is also transmitted from another RRH 20, and this original signal is given to the optical transceiver 210B. The original signal being a serial signal received by the optical transceiver 210B is given to the serial/parallel converter 221B. The serial/parallel converter 221B converts the original signal being a serial signal to parallel data (reproduction data).

The first switching unit 230 can switch the destination of the output of the serial/parallel converter 221B, between the data separator 251 and the full-rate transmission unit 240B. When the original signal is a 25.8 Gbps eCPRI signal, the destination of the output of the serial/parallel converter 221B is set to the data separator 251. The data separator 251 converts the reproduction data to two low-rate signals. When the original signal is a 9.8 Gbps CPRI signal, the destination of the output of the serial/parallel converter 221B is set to the full-rate transmission unit 240B. The full-rate transmission unit 240B outputs the given reproduction data without changing the transmission speed. Although the case where the original signal is a 9.8 Gbps CPRI signal is described as an example, the same applies to the case where the original signal is a 4.9 Gbps, 2.4 Gbps, or 1.2 Gbps CPRI signal.

Out of the three full-rate transmission units 240B, the three data separators 251, the nine parallel/serial converters 271A, 271B, the three high-speed optical transceivers 280A, and the six low-speed optical transceivers 280B, units which are no longer in use due to settings of the first switching unit 230 and the second switching unit 260, are invalidated.

Each data separator 251 has two output terminals, and outputs a low-rate signal from each output terminal. Each full-rate transmission unit 240B has one output terminal. The second switching unit 260 can switch connection between any of the two output terminals of the data separator 251 and the one output terminal of the full-rate transmission unit 240B, and any of the input terminals of two parallel/serial converters 271B. When the original signal is a 25.8 Gbps eCPRI signal, the two output terminals of the data separator 251 are respectively connected to the input terminals of the two parallel/serial converters 271B. When the original signal is a 9.8 Gbps CPRI signal, the one output terminal of the full-rate transmission unit 240B is connected to the input terminal of the parallel/serial converter 271B.

The WDM concentrator 200A according to the present embodiment includes three sets of: two optical transceivers 210A, 210B; two serial/parallel converters 221A, 221B; two full-rate transmission units 240A, 240B; one data separator 251; three parallel/serial converters 271A, 271B; one high-speed optical transceiver 280A; and two low-speed optical transceivers 280B as described above.

The high-speed optical transceiver 280A and the low-speed optical transceiver 280B respectively convert the electric signal to optical signals having different wavelengths, and output the optical signals to the multiplexer 291. The multiplexer 291 multiplexes the plurality of optical signals through wavelength division multiplexing (WDM), and outputs a multiplexed optical signal. The multiplexer 291 is connected to the WDM concentrator 200B being a counter device, via the optical fiber cable 201. The multiplexed optical signal outputted from the multiplexer 291 is transmitted through the optical fiber cable 201 and given to the WDM concentrator 200B.

[2-1. Data Separator]

Figure 3:
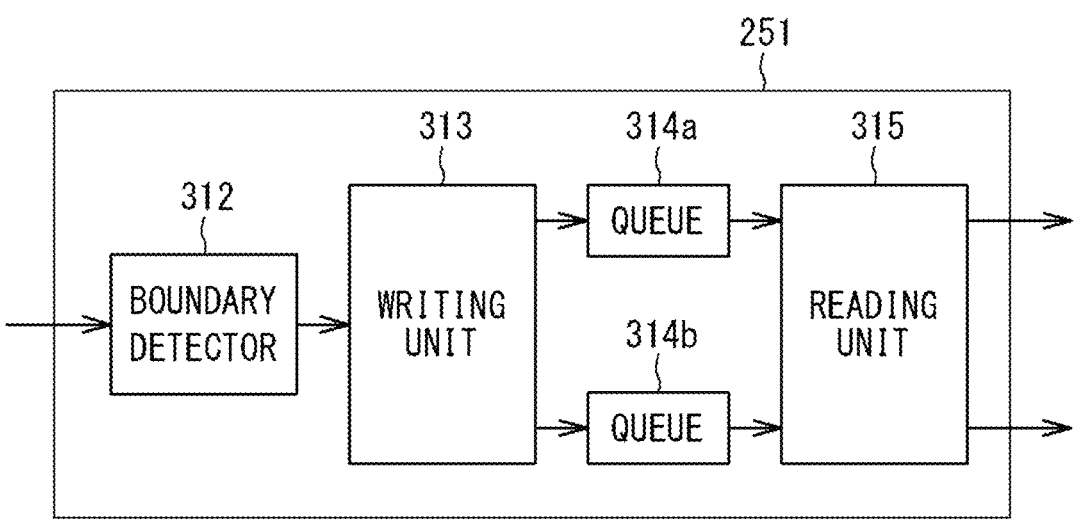
FIG. 3 is a block diagram showing an example of a configuration of a data separator included in the transmission device according to the embodiment.

FIG. 3 is a block diagram showing an example of a configuration of a data separator included in the transmission device according to the present embodiment. A data separator 251 includes a boundary detector 312, a writing unit 313, queues 314a, 314b, and a reading unit 315.

The eCPRI signal being a serial signal is given to the serial/parallel converter 221A (see FIG. 2A). The serial/parallel converter 221A extracts clock data from the eCPRI signal being a serial signal, performs timing reproduction, and converts serial data to parallel data (reproduction data) at a 25.8 Gbps clock rate. The 25.8 Gbps clock rate means, for example, 25.8/66 GHz for the case of 66-bit parallel data.

In the present embodiment, using code word markers (CWM) defined in 25GBASE-R, one 25.8 Gbps stream is divided into two 12.9 Gbps streams, and the two 12.9 Gbps streams are again combined into one 25.8 Gbps stream (hereinafter referred to as "half-rate conversion"). As for 25GE, RS(528,514)FEC (RS: Reed Solomon; FEC: error correction) is used. RS(528.514)FEC has a block length of 5280 bits, and a CWM is disposed for every 1024 blocks. A CWM is fixed data of 257 bits. In the present embodiment, a receiver side detects a CWM to identify a coding block (hereinafter referred to as "FEC block"). In the process of dividing one 25.8 Gbps stream into two 12.9 Gbps streams, CWMs are alternately distributed to both the streams. Furthermore, CWMs are detected from the 12.9 Gbps streams to detect boundaries of the FEC blocks in the streams, whereby the 12.9 Gbps streams are correctly combined into a single 25.8 Gbps stream. Thus, the boundaries of the FEC blocks can be detected without decoding the FEC blocks, thereby realizing low-delay processing.

Figure 4:
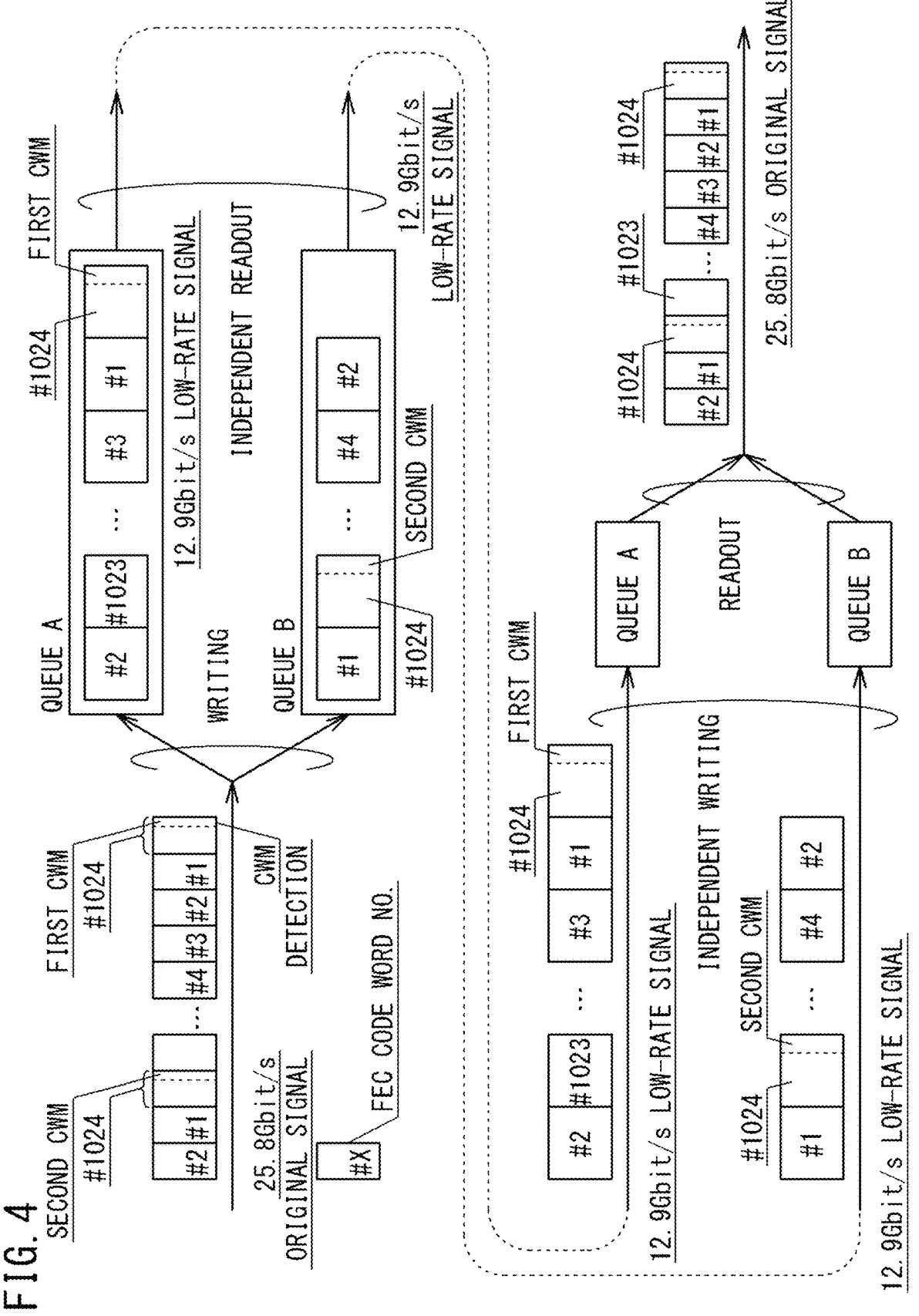
FIG. 4 illustrates an outline of half-rate conversion using code word markers.

The reproduction data is given to the boundary detector 312. The boundary detector 312 detects the CWMs included in the reproduction data. FIG. 4 illustrates an outline of half-rate conversion using CWMs. An eCPRI signal being RS-FEC RS(528,514) coded data has a configuration in which a plurality of FEC blocks are queued. Numbers from #1 to #1024 are respectively assigned to 1024 FEC blocks. No CWM is included in the FEC blocks #1 to #1023, and a CWM is included only in the FEC block #1024. The first 257 bits of the FEC block #1024 correspond to the CWM.

The boundary detector 312 detects a CWM from the given reproduction data to detect a boundary of FEC blocks. The boundary detector 312 divides the reproduction data according to the FEC blocks to generate divided data. The boundary detector 312 outputs, to the writing unit 313, the divided data (FEC blocks) such that the CWM is disposed at a predetermined position. That is, in the present embodiment, the divided data is adjusted such that a leading bit of the CWM is disposed at a leading bit of the parallel data. The writing unit 313 writes the given divided data into two queues 314a, 314b at a 25.8 Gbps clock rate. Each of the queues 314a, 314b has a data capacity for two blocks or more.

Figure 5:
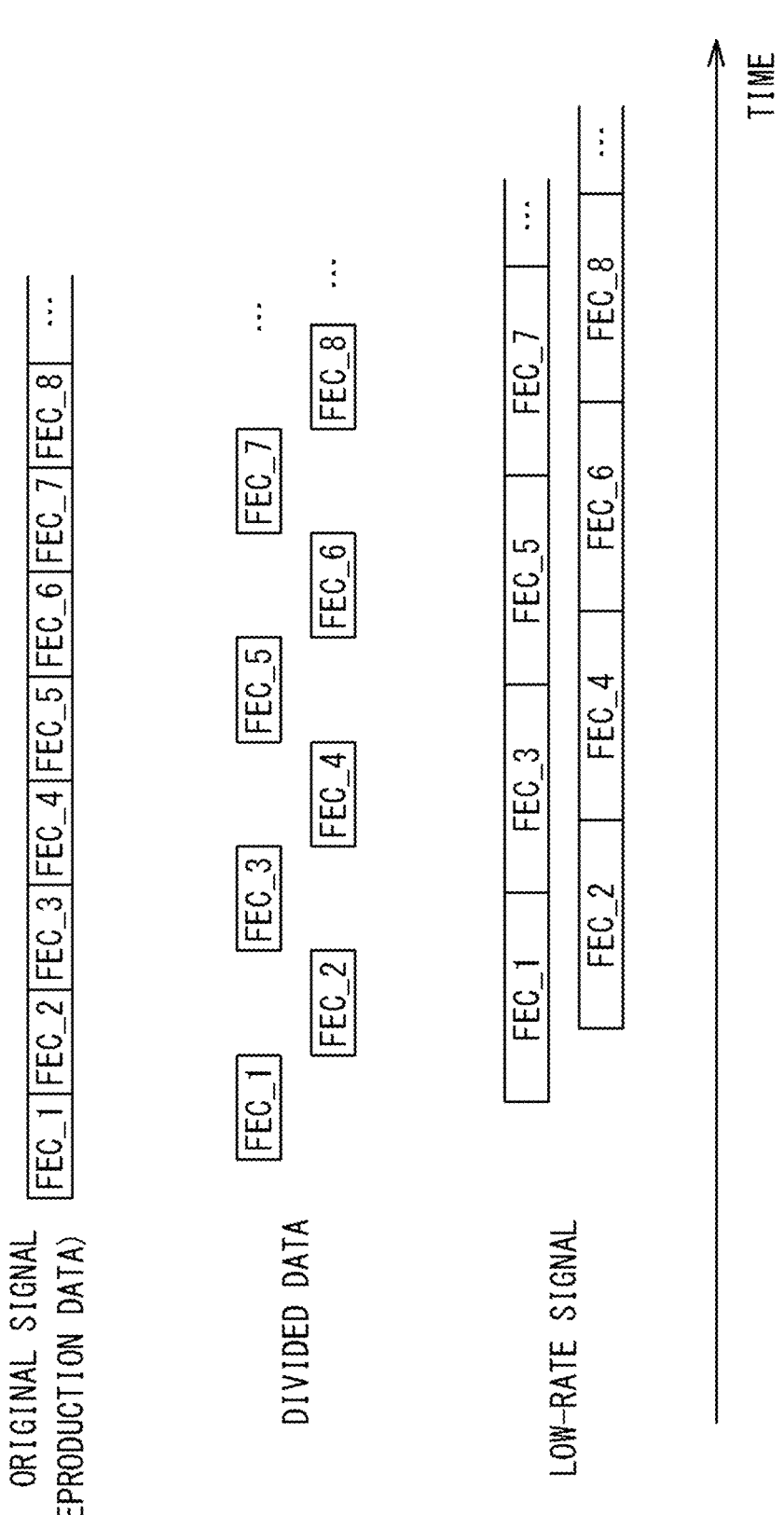
FIG. 5 is a timing chart showing an example of signal processing by the WDM concentrator serving as a transmission device according to the embodiment.

FIG. 5 is a timing chart showing an example of signal processing by the WDM concentrator 200 serving as a transmission device according to the present embodiment. The boundary detector 312 divides the reproduction data into block units. The writing unit 313 writes the FEC blocks (divided data) being parallel data, alternately into the two queues 314a. 314b. However, the FEC block #1024 and the FEC block #1 of the following reproduction data are written in the same queue. This writing operation allows the FEC blocks #1024 including the CWMs to be alternately assigned to the queues 314a, 314b.

The FEC blocks, into which the reproduction data is divided, may not necessarily be alternately distributed to the queues 314a, 314b. Data (divided blocks) obtained by further dividing the FEC blocks may be distributed to the queues 314a, 314b. In a specific example, the reproduction data may be divided in units of 2640-bit blocks (hereinafter referred to as "½ FEC blocks") that are obtained by further dividing an FEC block into two blocks, and the ½ FEC blocks may be alternately distributed to the queues 314a, 314b. In this case, a ½ FEC block including a CWM is written in the same queue as the immediately previous ½ FEC block. The number into which an FEC block is divided is not limited to two. Each divided block needs to have a size of 257 bits or more so as to be able to include a CWM. That is, the number into which an FEC block is divided may be twenty or less. Moreover, each of the queues 314a, 314b may have a data capacity for two or more divided blocks.

Referring back to FIG. 3, the reading unit 315 reads out the FEC blocks or the divided blocks from the two queues 314a, 314b at a 12.9 Gbps clock rate. The 25.8 Gbps clock rate is an example of a first speed, and the 12.9 Gbps clock rate is an example of a second speed. Writing and readout of the FEC blocks or the divided blocks in and from the queues 314a, 314b are performed by FIFO (First In, First Out). The queues 314a, 314b are temporary storage units from which user data (blocks) are read out by the reading unit 315 in the order as written therein by the writing unit 313. For example, the queues 314a, 314b may be buffers capable of holding data equivalent to two blocks or more. In this case, the data separator 251 includes two buffers (A, B), the writing unit 313 writes block data alternately in the buffers A, B at a first rate (however, the FEC block #1024 (or the divided block) including the CWM is written in the same buffer as the immediately subsequent block (block #1 in the case of the FEC block)), and the reading unit 315 reads out, at a second rate, the block data written in the buffers A, B.

The reading unit 315 outputs the FEC blocks or the divided blocks read out from the two queues 314a, 314b, to corresponding channels. That is, the FEC blocks or the divided blocks read out from the queue 314a are outputted as one signal to one parallel/serial converter 271B, while the FEC blocks or the divided blocks read out from the queue 314b are outputted as another signal to another parallel/serial converter 271B. Thus, two low-rate signals (parallel signals) are generated at a 12.9 Gbps clock rate. The reading unit 315 gives the two 12.9 Gbps parallel signals to two parallel/serial converters 271B, respectively.

[2-2. Full-Rate Transmitter]

Figure 6:
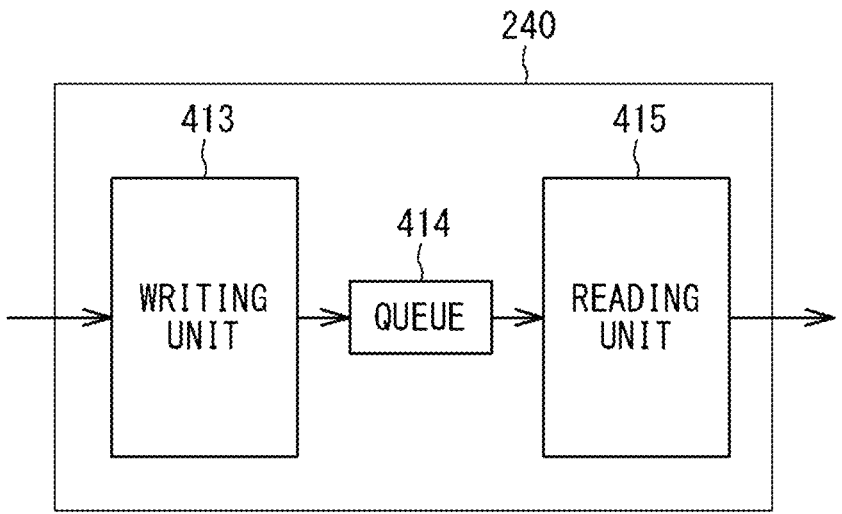
FIG. 6 is a block diagram showing an example of a configuration of a full-rate transmission unit included in the transmission device and the reception device according to the embodiment.

FIG. 6 is a block diagram showing an example of a configuration of a full-rate transmission unit included in the transmission device according to the present embodiment. In the following description, the full-rate transmission units 240A, 240B are also collectively referred to as "full-rate transmission unit 240". The full-rate transmission unit 240 includes a writing unit 413, a queue 414, and a reading unit 415.

In the case where the original signal given to the serial/parallel converter 221B (see FIG. 2A) is an eCPRI signal, the serial/parallel converter 221B extracts clock data from the eCPRI signal being a serial signal, performs timing reproduction, and converts serial data to parallel data (reproduction data) at a 25.8 Gbps clock rate. In the case where the original signal given to the serial/parallel converter 221B is a 9.8 Gbps CPRI signal, the serial/parallel converter 221B extracts clock data from the CPRI signal being a serial signal, performs timing reproduction, and converts serial data to parallel data (reproduction data) at a 9.8 Gbps clock rate.

The reproduction data is given to the writing unit 413. The writing unit 413 detects a CWM from the given reproduction data to detect a boundary of FEC blocks. The writing unit

413 divides the reproduction data in units of FEC blocks, and writes the divided data in one queue 414 at the above clock rate (25.8 Gbps or 9.8 Gbps).

The reading unit 415 reads out the FEC blocks or the divided blocks from the one queue 414 at the above clock rate. Writing and readout of the FEC blocks or the divided blocks are performed in and from the queue 414 by FIFO. The reading unit 415 reads out the block data after holding the block data in the queue 414 for a certain period of time so as to generate a delay time equivalent to that in the data separator 251. Thus, the signal output timing of the full-rate transmission unit 240 can be synchronized with the signal output timing of the data separator 251. The queue 414 is a temporary storage unit from which user data (blocks) are read by the reading unit 415 in the order as written therein by the writing unit 413. For example, the queue 414 may be a buffer capable of holding data equivalent to two blocks or more. In this case, the full-rate transmission unit 240 includes one buffer, the writing unit 413 writes the block data in this buffer at the above clock rate, and the reading unit 415 reads out the block data from the buffer at the above clock rate.

The reading unit 415 outputs the FEC blocks or the divided blocks read out from the queue 414, to the parallel/serial converter 271A or 271B. Thus, an eCPRI signal or a CPRI signal, being a serial signal, is generated such that the signal is delayed by a delay time equivalent to that of the low-rate signal outputted from the data separator 251.

[3. Reception Device]

Hereinafter, the configuration of the WDM concentrator serving as a reception device will be described with reference to FIG. 2B.

In the case where the WDM concentrator 200 serves as a transmission device, as shown in FIG. 2A, the WDM concentrator 200 includes six optical transceivers 210A, 210B, six parallel/serial converters 222A, 222B, one first switching unit 230, six full-rate transmission units 240A, 240B, three data couplers 252, one second switching unit 260, nine serial/parallel converters 272A, 272B, three high-speed optical transceivers 280A, six low-speed optical transceivers 280B, and one demultiplexer 292. In the case where the WDM concentrator 200 serves as a reception device, the input sides and the output sides, of the optical transceivers 210A, 210B, the parallel/serial converters 222A, 222B, the six full-rate transmission units 240A, 240B, the data couplers 252, the serial/parallel converters 272A, 272B, the high-speed optical transceivers 280A, the low-speed optical transceivers 280B, and the demultiplexer 292, are opposite to those in the case where the WDM concentrator 200 serves as a transmission device.

The multiplexer 291 also serves as a demultiplexer. The demultiplexer 292 is a component having the same configuration as the multiplexer 291. A wavelength group to be demultiplexed by the demultiplexer 292 is matched with wavelength groups of signals transmitted from the high-speed optical transceiver 230A and the low-speed optical transceiver 280B. The order of signal transmission lines constituted by the optical transceivers 210A, 210B, the serial/parallel converters 221A, 221B, the six full-rate transmission units 240A, 240B, the data separators 251, the parallel/serial converters 271A. 271B, the high-speed optical transceivers 280A, and the low-speed optical transceivers 280B in the transmission device can be matched with the order of signal transmission lines constituted by the optical transceivers 210A, 210B, the parallel/serial converters 222A. 222B, the six full-rate transmission units 240A, 240B, the data couplers 252, the serial/parallel converters 272A, 272B, the high-speed optical transceivers 280A, and the low-speed optical transceivers 280B in the reception device. The serial/parallel converter 221A, 221B includes a serial/parallel conversion circuit for converting a serial signal to a parallel signal, and a parallel/serial conversion circuit for converting a parallel signal to a serial signal. The multiplexed optical signal transmitted from the WDM concentrator 200B is separated into a plurality of optical signals according to the optical wavelengths, and the optical signals are given to the optical transceivers 280A, 280B. The optical signal converted from the eCPRI signal without changing the transmission speed is given to the high-speed optical transceiver 280A and is converted to a serial electric signal (reproduction data). The optical signal converted from the CPRI signal without changing the transmission speed is given to the low-speed optical transceiver 280B and is converted to a serial electric signal (reproduction data). The serial signal is given to the serial/parallel converter 272A or 272B and is converted to a parallel signal. The optical signal (low-rate optical signal) converted from the low-rate signal is given to the low-speed optical transceiver 280B and is converted to a serial electric signal (reproduction data). The serial signal thus obtained is given to the serial/parallel converter 272B and is converted to a parallel signal.

The second switching unit 260 can switch the destinations of outputs from one high-speed optical transceiver 280A and two low-speed optical transceivers 280B, between the full-rate transmission units 240A, 240B and the data coupler 252. That is, the second switching unit 260 can switch the destinations of outputs from one serial/parallel converter 272A and two serial/parallel converters 272B, between the full-rate transmission units 240A, 240B and the data coupler 252.

The serial/parallel converters 272A, 272B each convert the reproduction data being a serial signal, to a parallel signal. The serial signal being a 25.8 Gbps eCPRI signal is given to the serial/parallel converter 272A to which the high-speed optical transceiver 280A is connected, and the serial signal is converted to a parallel signal. In this case, the destination of the output from the serial/parallel converter 272A is set to the full-rate transmission unit 240A by the second switching unit 260. A 9.8 Gbps CPRI signal is given to each of two serial/parallel converters 272B to which the low-speed optical transceivers 280B are connected, or two low-rate signals (12.9 Gbps) into which one eCPRI signal is divided are respectively given to the two serial/parallel converters 272B. In the case where the original signal is a 9.8 Gbps CPRI signal, the destinations of the outputs of the two serial/parallel converters 272B are set to the full-rate transmission units 240A, 240B by the second switching unit 260. In the case where the multiplexed optical signal includes low-rate optical signals and two low-rate signals are given to the two serial/parallel converters 272B, the destination of the outputs of the two serial/parallel converters 272B is set to the data coupler 252 by the second switching unit 260.

The full-rate transmission units 240A, 240B each output the given parallel signal without changing the transmission speed. The data coupler 252 couples the given two low-rate signals to restore an eCPRI signal.

An output terminal of the full-rate transmission unit 240A is connected to an input terminal of the parallel/serial converter 222A. The eCPRI signal being a parallel signal outputted from the full-rate transmission unit 240A is converted to a serial signal by the parallel/serial converter 222A and is outputted to the outside from the optical transceiver 210A.

The first switching unit 230 can switch the connecting destination of the input terminal of the parallel/serial converter 222B, between the output terminal of the data coupler 252 and the output terminal of the full-rate transmission unit 240B. In the case where the eCPRI signal being a parallel signal is outputted from the data coupler 252, the output terminal of the data coupler 252 is connected to the input terminal of the parallel/serial converter 222B by the first switching unit 230. The eCPRI signal outputted from the data coupler 252 is converted to a serial signal by the parallel/serial converter 222B and is outputted to the outside from the optical transceiver 210B.

In the case where the CPRI signal being a parallel signal is outputted from the full-rate transmission unit 240B, the output terminal of the full-rate transmission unit 240B is connected to the input terminal of the parallel/serial converter 222B by the first switching unit 230. The output signal from the full-rate transmission unit 240B is converted to a serial signal by the parallel/serial converter 222B and is outputted to the outside from the optical transceiver 210B.

[3-1. Data Coupler]

Figure 7:
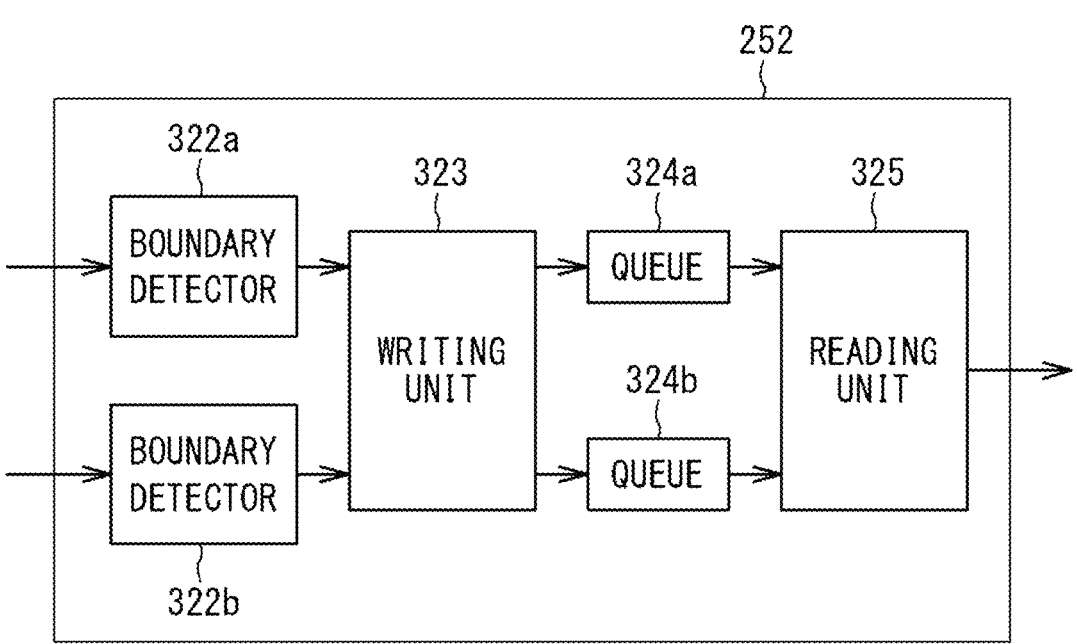
FIG. 7 is a block diagram showing an example of a configuration of a data coupler included in the reception device according to the embodiment.

FIG. 7 is a block diagram showing an example of a configuration of a data coupler included in the reception device according to the present embodiment. A data coupler 252 includes boundary detectors 322a, 322b, a writing unit 323, queues 324a, 324b, and a reading unit 325.

The low-rate optical signals converted from the multiplexed optical signal by the demultiplexer 292 are converted to serial electric signals by the low-speed optical transceivers 280B and are given to the serial/parallel converters 272B (see FIG. 2B). The two serial/parallel converters 272B each extract clock data from the low-rate signal being a serial signal, perform timing reproduction, and convert serial data to parallel data (reproduction data) at a 12.9 Gbps clock rate.

The reproduction data being parallel data are given to the boundary detectors 322a, 322b. The boundary detectors 322a, 322b each detect a CWM included in the reproduction data to detect a boundary of FEC blocks or divided blocks (divided data) in the reproduction data (low-rate signal), based on the same division units as in the transmission device. Furthermore, the boundary detectors 322a, 322b each output the FEC blocks or the divided blocks to the writing unit 323. The boundary detectors 322a, 322b each give a mark (information) to the FEC block #1024 (or the divided block) including the CWM. This mark is used by the reading unit 325 to identify the FEC block (or the divided block) including the CWM. The writing unit 323 writes the two channels of FEC blocks or divided blocks outputted from the respective boundary detectors 322a, 322b, into the corresponding queues 324a, 324b at a 12.9 Gbps clock rate.

The reading unit 325 reads out the FEC blocks from the two queues 324a, 324b at a 25.8 Gbps clock rate. Here, the reading unit 325 identifies the FEC block #1024 (or the divided block) including the CWM, by using the marks added by the boundary detectors 322a, 322b. The FEC block #1024 (or the divided block) including the CWM and the immediately subsequent block are sequentially read out from the same queue. The reading unit 325 combines the read FEC blocks to restore an eCPRI signal (original signal) being a parallel signal.

Figure 8:
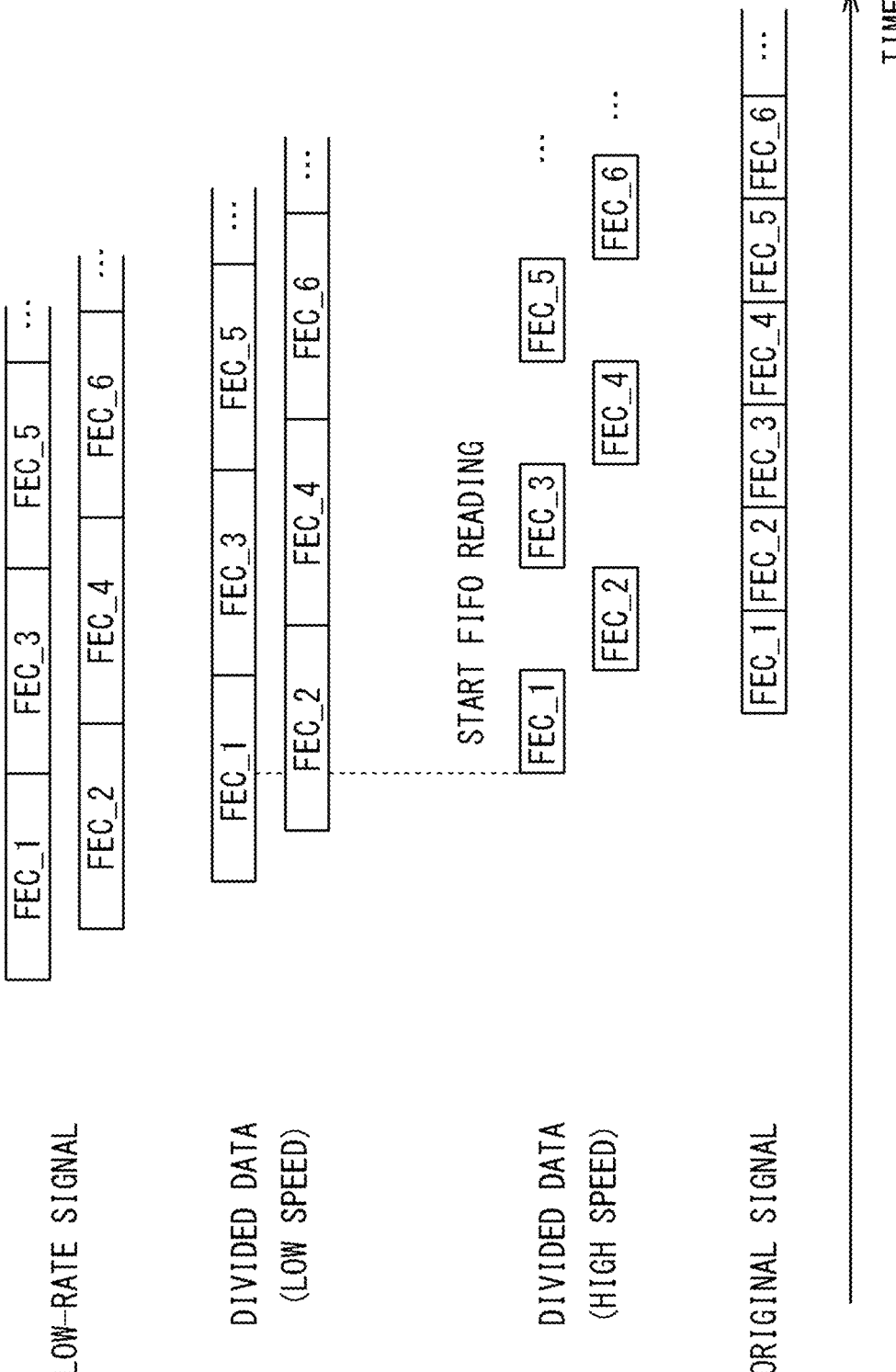
FIG. 8 is a timing chart showing an example of signal processing by the WDM concentrator serving as a reception device according to the embodiment.

FIG. 8 is a timing chart showing an example of signal processing by the WDM concentrator 200 serving as a reception device, according to the present embodiment. In this example, divided data are used as FEC blocks. The reception device receives two channels of low-rate optical signals. The two channels of low-rate optical signals are respectively received by two low-speed optical transceivers 280B, are converted to low-rate signals being serial electric signals, and are respectively given to two serial/parallel converters 272B.

The two serial/parallel converters 272B each convert the low-rate signal from a serial signal to a parallel signal.

The boundary detectors 322a, 322b each detect a boundary of adjacent FEC blocks. Since the block length of an FEC block is 5280 bits, if the boundary detector 322a. 322b detects a CWM in the FEC block #1024 to detect a boundary of FEC blocks, the boundary detector 322a, 322b can detect a boundary for every 5280 bits, without decoding the FEC blocks.

The boundary detector 322a, 322b may check normality of the FEC blocks. For example, the boundary detector 322a, 322b may decode the FEC blocks, and if a state in which the FEC blocks are not correctly decoded continues, the boundary detector 322a, 322b may determine that a boundary of the FEC blocks is not correctly detected.

The boundary detectors 322a, 322b each output divided FEC blocks to the writing unit 323. That is, the boundary detector 322a outputs one channel of FEC blocks to the writing unit 323, while the boundary detector 322b outputs the other channel of FEC blocks to the writing unit 323. The boundary detectors 322a, 322b each add, to an FEC block #1024 including a CWM, a mark (information indicating that this block includes the CWM). The writing unit 323 writes the FEC blocks (divided data) being parallel data into two queues 324a, 324b. That is, the FEC blocks outputted from the boundary detector 322a are written in the queue 324a, while the FEC blocks outputted from the boundary detector 322b are written in the queue 324b. The mark indicating that the block includes the CWM may be transferred to the reading unit 325 by using a queue (not shown) different from the queues 324a, 324b.

The reading unit 325 sequentially reads out the FEC blocks from the two queues 324a, 324b at a 25.8 Gbps clock rate. The reading unit 325 sequentially reads out the one channel of FEC blocks from the queue 324a, and sequentially reads out the other channel of FEC blocks from the queue 324b. Furthermore, the reading unit 325 reads out the FEC blocks alternately from the two queues 324a, 324b. Thus, the FEC blocks are read out one by one in the order of FEC_1, FEC_2, FEC_3, . . . . Since the block length of each FEC block is sufficiently large against delay fluctuation, the probability of occurrence of overtaking FEC blocks between the two channels is extremely low.

The reading unit 325 combines the read FEC blocks to restore an eCPRI signal (first signal) being a parallel signal at a 25.8 Gbps clock rate. Here, the FEC blocks #2 to #1024 are alternately read out from the two queues 324a, 324b, but the FEC block #1024 and the subsequent FEC block #1 are continuously read out from the same queue. In a specific example, the reading unit 325 identifies the FEC block #1024 by using the above-described mark, and reads out the immediately subsequent FEC block #1 from the same queue. The read FEC blocks are combined to restore an eCPRI signal in which the FEC blocks #1 to #1024 are queued in order. The reading unit 325 gives the restored eCPRI signal to the parallel/serial converter 222B. The parallel/serial converter 222B converts the parallel signal to a serial signal, and outputs the converted eCPRI signal to the optical transceiver 210B. The optical transceiver 210B converts the eCPRI signal being an electric signal to an optical signal, and outputs the optical signal.

The reading unit 325 may check the normality of the read blocks. For example, in the case where the divided data are FEC blocks, the reading unit 325 may decode the FEC blocks, and if a state in which the FEC blocks are not correctly decoded continues, the reading unit 325 may determine that a boundary of the FEC blocks is not correctly detected.

[3-2. Full-Rate Transmitter]

An example of a configuration of a full-rate transmission unit included in the reception device of the present embodiment will be described with reference to FIG. 6. A full-rate transmission unit 240 includes a writing unit 413, a queue 414, and a reading unit 415.

When the reception device has received a multiplexed optical signal including an eCPRI signal, 25.8 Gbps reproduction data is given to the writing unit 413. When the reception device has received a multiplexed optical signal including a CPRI signal, 9.8 Gbps reproduction data is given to the writing unit 413.

The writing unit 413 detects a CWM included in the reproduction data to detect a boundary of FEC blocks or divided blocks (divided data) in the reproduction data, based on the same division units as in the transmission device. The writing unit 413 writes the FEC blocks or the divided blocks in the single queue 414 at the above clock rate (25.8 Gbps or 9.8 Gbps).

The reading unit 415 reads out the FEC blocks from the queue 414 at the above clock rate. Writing and readout of the FEC blocks or the divided blocks in and from the queue 414 are performed by FIFO. The reading unit 415 reads out the block data after holding the block data in the queue 414 for a certain period of time so as to generate a delay time equivalent to that in the data coupler 252. Thus, the signal output timing of the full-rate transmission unit 240 can be synchronized with the signal output timing of the data coupler 252. The reading unit 415 combines the read FEC blocks to restore an eCPRI signal or a CPRI signal (original signal) being a parallel signal.

[4. Setting Switching Method for WDM Concentrator]

The first switching unit 230 and the second switching unit 260 can be set by, for example, a DIP switch (not shown) provided in the WDM concentrator 200. A terminal device for setting (not shown) may be connected to the WDM concentrator 200, and the user may set the first switching unit 230 and the second switching unit 260 by operating the terminal device. The first switching unit 230 and the second switching unit 260 may be remotely set by using a known outbound communication manager.

For example, when the WDM concentrators 200A and 200B are installed or when the standard of signals to be given from the RRH 20 or the BBU 30 to the WDM concentrators 200A and 200B is changed, the user operates the first switching unit 230 and the second switching unit 260 to change the settings of the WDM concentrators 200A, 200B.

Using the DIP switch provided in the WDM concentrator 200 serving as a transmission device, the terminal device connected to the WDM concentrator 200, or the outbound communication manager, the user operates the first switching unit 230 to switch connection between the optical transceiver 210B, and any of the full-rate transmission unit 240B and the data separators 251 (first step). Using the DIP switch, the terminal device, or the outbound communication manager, the user operates the second switching unit 260 to switch connection between any of the full-rate transmission units 240A, 240B and the data separators 251, and any of the high-speed optical transceiver 280A and the low-speed optical transceiver 280B (second step).

When the WDM concentrator 200 serves as a reception device, the second step corresponds to a step of operating the second switching unit 260 to switch connection between any of the high-speed optical transceiver 280A and the low-speed optical transceiver 280B, and any of the full-rate transmission units 240A, 240B and the data coupler 252. When the WDM concentrator 200 serves as a reception device, the first step corresponds to a step of operating the first switching unit 230 to switch connection between the optical transceiver 210B and any of the full-rate transmission unit 240B and the data coupler 252.

Furthermore, the patterns of signals given to the serial/parallel converters 221A, 221B and the parallel/serial converters 222A, 222B may be analyzed to determine whether the original signal is an eCPRI signal or a CPRI signal, and the first switching unit 230 and the second switching unit 260 may be automatically set according to the original signal.

[5. Reception Characteristics and Reception Sensitivity of Optical Transceiver]

Figure 9:
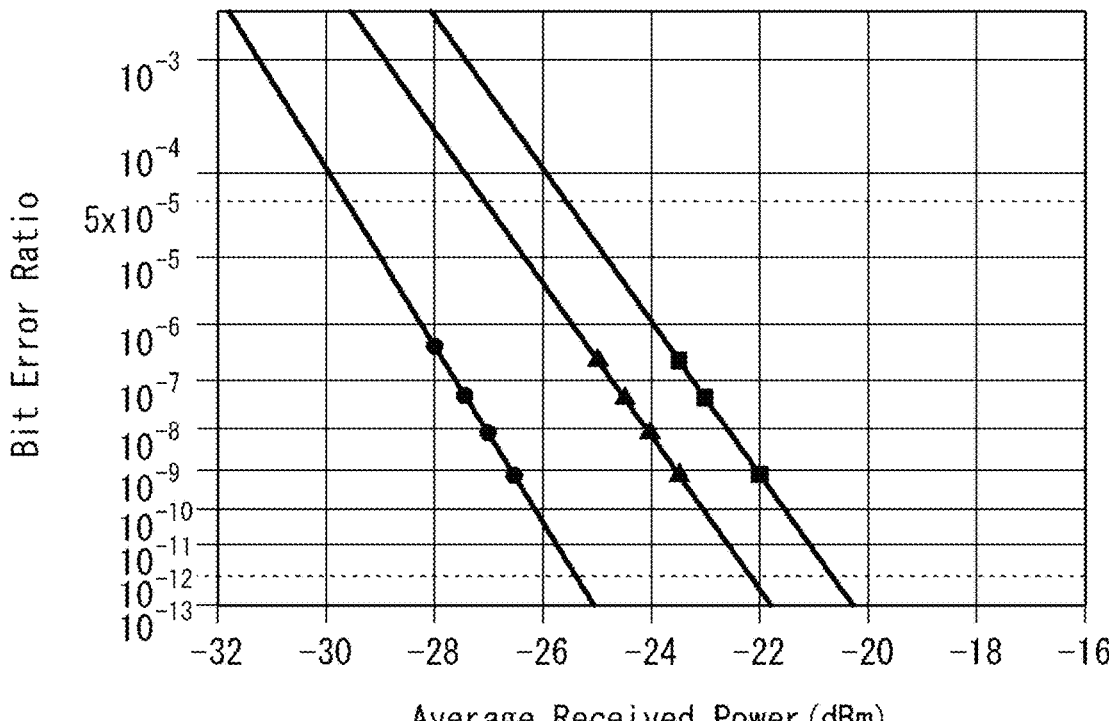
FIG. 9 is a graph showing reception characteristics of a high-speed optical transceiver and a low-speed optical transceiver.

In the present embodiment, as described above, the high-speed optical transceiver 280A and the low-speed optical transceiver 280B are used. The high-speed optical transceiver 280A corresponds to a communication speed of 25.8 Gbps, and the low-speed optical transceiver 280B corresponds to communication speeds of 9.8 Gbps and 12.9 Gbps. FIG. 9 shows graphs representing reception characteristics of the high-speed optical transceiver 280A and the low-speed optical transceiver 280B. In FIG. 9, the high-speed optical transceiver 280A is represented as "25G TRx", and the low-speed optical transceiver 280B is represented as "10G TRx". In FIG. 9, the horizontal axis represents "average received power", and the vertical axis represents "bit error ratio (BER)". The graph plotted by rectangular marks represents the reception characteristics when a 25.8 Gbps eCPRI signal is received by the high-speed optical transceiver 280A, the graph plotted by triangular marks represents the reception characteristics when a 9.8 Gbps CPRI signal is received by the high-speed optical transceiver 280A, and the graph plotted by circular marks represents the reception characteristics when a 9.8 Gbps CPRI signal is received by the low-speed optical transceiver 280B.

The high-speed optical transceiver 280A is required to have performance that allows an eCPRI signal subjected to error correction coding to have $BER=5\times10^{-5}$ or lower. The low-speed optical transceiver 280B is required to have performance that allows a CPRI signal not subjected to error correction coding to have $BER=1\times10^{-12}$ or lower. The high-speed optical transceiver 280A corresponds to the communication speed of 25 Gbps, but can also receive a 9.8 Gbps optical signal. When the high-speed optical transceiver 280A receives a 9.8 Gbps CPRI signal, improvement of sensitivity by 2 to 3 dB compared with the eCPRI signal is expected due to a reduction in ISI (Inter-Symbol Interference) penalty. However, while the reception sensitivity at a reference value ($5\times10^{-5}$) of the BER in the eCPRI signal is −25.6 dBm, the reception sensitivity at a reference value ($1\times10^{-12}$) of the BER in the CPRI signal is −22.2 dBm, i.e., the reception sensitivity is degraded. Therefore, when CPRI signal is used, power budget is reduced.

When the low-speed optical transceiver 280B is used, the reception band is reduced to about ⅓ compared with the high-speed optical transceiver 280A and thereby the noise band is also reduced, so that improvement of sensitivity by 4 to 5 dB is expected. Therefore, the reception sensitivity at the reference value ($1\times10^{-12}$) of the BER in the CPRI signal is −25.4 dBm, which is almost equal to −25.6 dBm that is the reception sensitivity achieved when the eCPRI signal is received in the high-speed optical transceiver 280A. Moreover, the low-speed optical transceiver 280B can increase the transmission amplitude, compared with the high-speed optical transceiver 280A. Therefore, power budget equal to or greater than that in transmission of the eCPRI signal in the high-speed optical transceiver 280A can be ensured even without error correction. That is, when transmitting a CPRI signal, power budget is greater in the case of using the low-speed optical transceiver 280B than in the case of using the high-speed optical transceiver 280A. Having a different viewpoint, the transmission distance can be increased when the high-speed optical transceiver 280A is used for an eCPRI signal while using the low-speed optical transceiver 280B for a CPRI signal, compared with the case where both the eCPRI signal and the CPRI signal are transmitted by using a single high-speed optical transceiver.

[6. Example of Setting of WDM Concentrator]

Hereinafter, an example of setting of the WDM concentrator will be described. The communication system 10 according to the present embodiment allows each of the first base station and the second base station to be changed to a 4G base station and a 5G base station. That is, the first base station can be a 4G base station and a 5G base station, and the second base station can be a 4G base station and a 5G base station.

[6-1. CPRI Signal×6]

Figure 10:
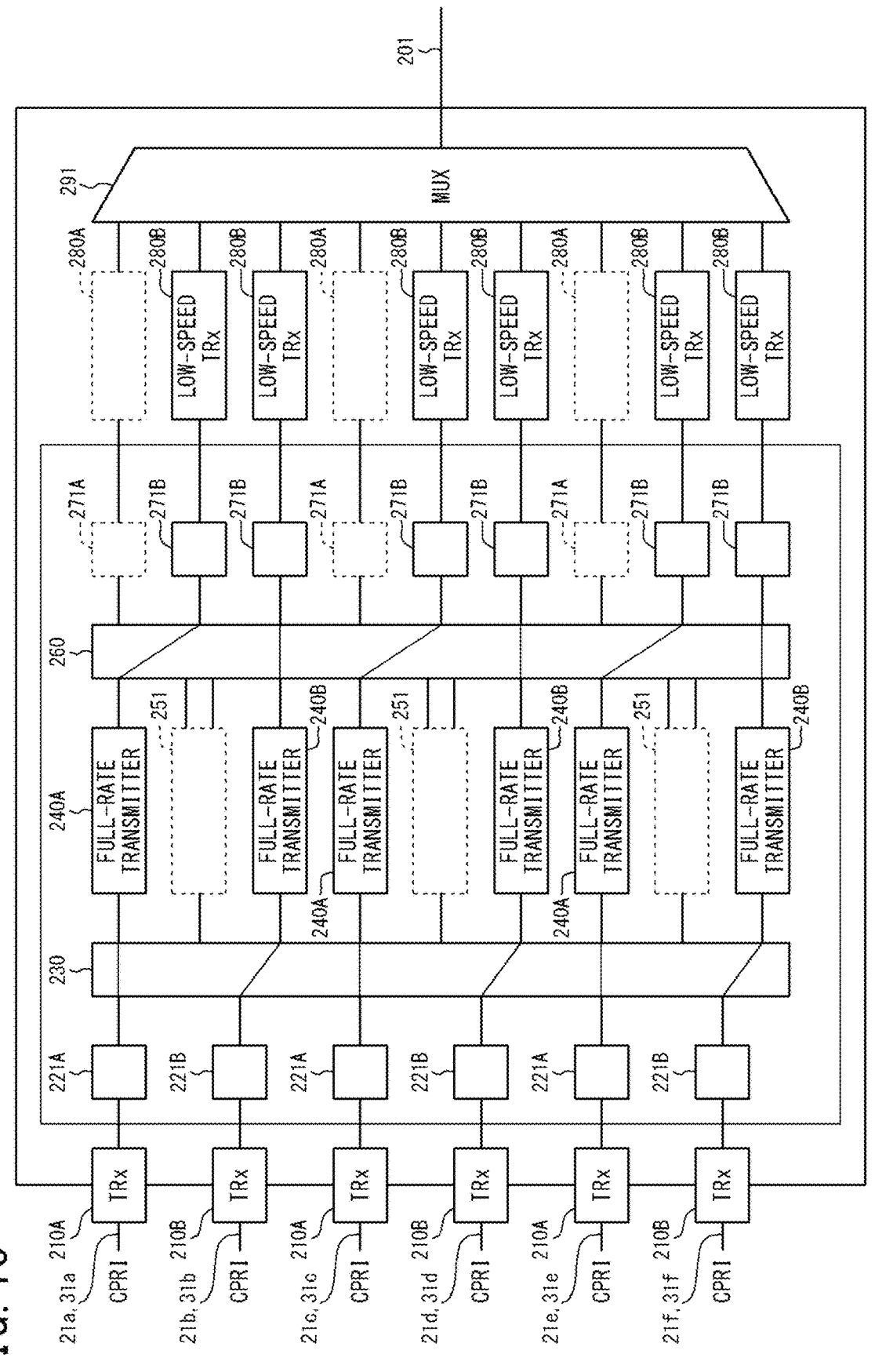
FIG. 10 shows an example of setting of the WDM concentrator in the case where all six original signals are CPRI signals.

FIG. 10 shows an example of setting of the WDM concentrator 200 in the case where all six original signals are CPRI signals. In the transmission device, in the first switching unit 230, the serial/parallel converters 221A are connected to the full-rate transmission units 240A, and the serial/parallel converters 221B are connected to the full-rate transmission units 240B. In the second switching unit 260, the full-rate transmission units 240A are connected to the parallel/serial converters 271B, and the full-rate transmission units 240B are connected to the parallel/serial converters 271B. Three data separators 251, three parallel/serial converters 271A, and three high-speed optical transceivers 280A are invalidated as unused blocks. In FIG. 10, units indicated by broken lines are invalidated. Although FIG. 10 shows the setting of the WDM concentrator 200 serving as a transmission device, the setting of the WDM concentrator 200 serving as a reception device is the same as that shown in FIG. 10. In the reception device, in the first switching unit 230, the parallel/serial converters 222A are connected to the full-rate transmission units 240A, and the parallel/serial converters 222B are connected to the full-rate transmission units 240B. In the second switching unit 260, the full-rate transmission units 240A are connected to the serial/parallel converters 272B, and the full-rate transmission units 240B are connected to the serial/parallel converters 272B. Three data couplers 252, three serial/parallel converters 272A, and three high-speed optical transceivers 280A are invalidated as unused blocks. The second switching unit 260 of the transmission device may connect the full-rate transmission units 240A to the parallel/serial converters 271A, and the second switching unit 260 of the reception device may connect the full-rate transmission units 240A to the serial/parallel converters 272A. However, since the low-speed optical transceivers 280B can optically transmit a low-speed CPRI signal more efficiently than the high-speed optical transceiver 280A, it is preferable that the full-rate transmission units 240A are connected to the parallel/serial converters 271B in the transmission device and the full-rate transmission units 240A are connected to the serial/parallel converters 272B in the reception device.

The above setting is used when both the first base station and the second base station are 4G base stations. That is, in FIG. 1, each of the optical fiber cables 21*a*, 21*c*, 21*e*, 31*a*, 31*c*, 31*e* transmits a CPRI signal, and each of the optical fiber cables 21*b*, 21*d*, 21*f*, 31*b*, 31*d*, 31*f* transmits a CPRI signal.

[6-2. CPRI Signal×3, eCPRI Signal×3]

Figure 11:
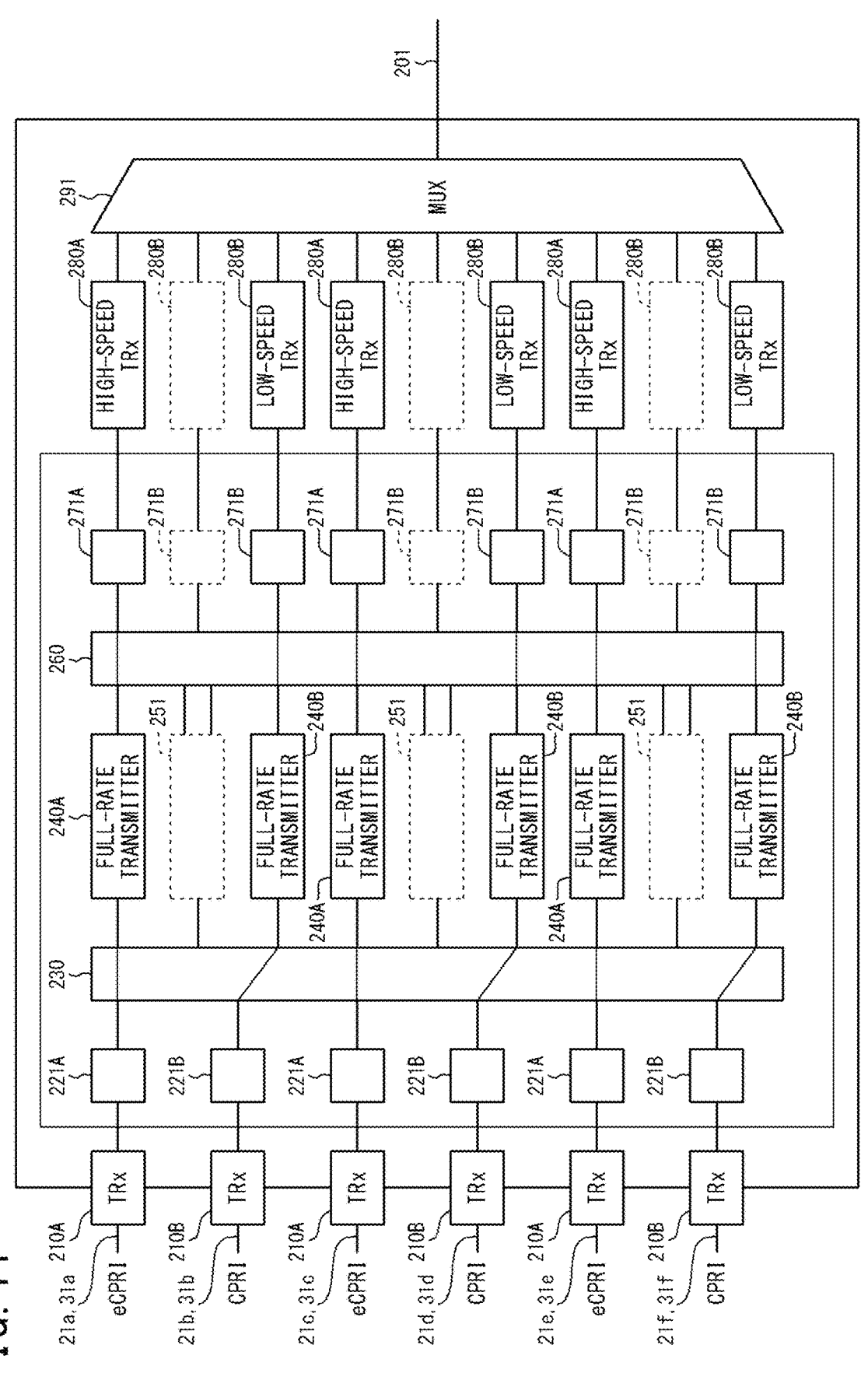
FIG. 11 shows an example of setting of the WDM concentrator in the case where three out of the six original signals are CPRI signals and the other three are eCPRI signals.

FIG. 11 shows an example of setting of the WDM concentrator 200 in the case where three out of six original signals are CPRI signals and the other three are eCPRI signals. In the transmission device, in the first switching unit 230, the serial/parallel converters 221A are connected to the full-rate transmission units 240A, and the serial/parallel converters 221B are connected to the full-rate transmission units 240B. In the second switching unit 260, the full-rate transmission units 240A are connected to the parallel/serial converters 271A, and the full-rate transmission units 240B are connected to the parallel/serial converters 271B. Three data separators 251, three parallel/serial converters 271B, and three low-speed optical transceivers 280B are invalidated as unused blocks. Although FIG. 11 shows the setting of the WDM concentrator 200 serving as a transmission device, the setting of the WDM concentrator 200 serving as a reception device is the same as that shown in FIG. 11. In the reception device, in the first switching unit 230, the parallel/serial converters 222A are connected to the full-rate transmission units 240A, and the parallel/serial converters 222B are connected to the full-rate transmission units 240B. In the second switching unit 260, the full-rate transmission units 240A are connected to the serial/parallel converters 272A, and the full-rate transmission units 240B are connected to the serial/parallel converters 272B. Three data couplers 252, three serial/parallel converters 272B, and three low-speed optical transceivers 280B are invalidated as unused blocks.

The above setting is used when the first base station is a 5G base station and the second base station is a 4G base station. That is, in FIG. 1, each of the optical fiber cables 21*a*, 21*c*, 21*e*, 31*a*, 31*c*, 31*e* transmits an eCPRI signal, and each of the optical fiber cables 21*b*. 21*d*, 21*f*, 31*b*, 31*d*, 31*f* transmits a CPRI signal.

In the case where the first base station is a 4G base station and the second base station is a 5G base station, setting of the WDM concentrator 200 is different from the above setting. That is, in the transmission device, in the first switching unit 230, the serial/parallel converters 221A are connected to the full-rate transmission units 240A, and the serial/parallel converters 221B are connected to the data separators 251. In the second switching unit 260, the full-rate transmission units 240A are connected to the parallel/serial converters 271A, and each of the data separators 251 is connected to two parallel/serial converters 271B. Three full-rate transmission units 240B are invalidated as unused blocks. This setting is the same as setting shown in the following section 6-3. In the reception device, in the first switching unit 230, the parallel/serial converters 222A are connected to the full-rate transmission units 240A, and the parallel/serial converters 222B are connected to the data couplers 252. In the second switching unit 260, the full-rate transmission units 240A are connected to the serial/parallel converters 272A, and each of the data couplers 252 is connected to two serial/parallel converters 272B. Three full-rate transmission units 240B are invalidated as unused blocks.

[6-3. eCPRI Signal×6]

Figure 12:
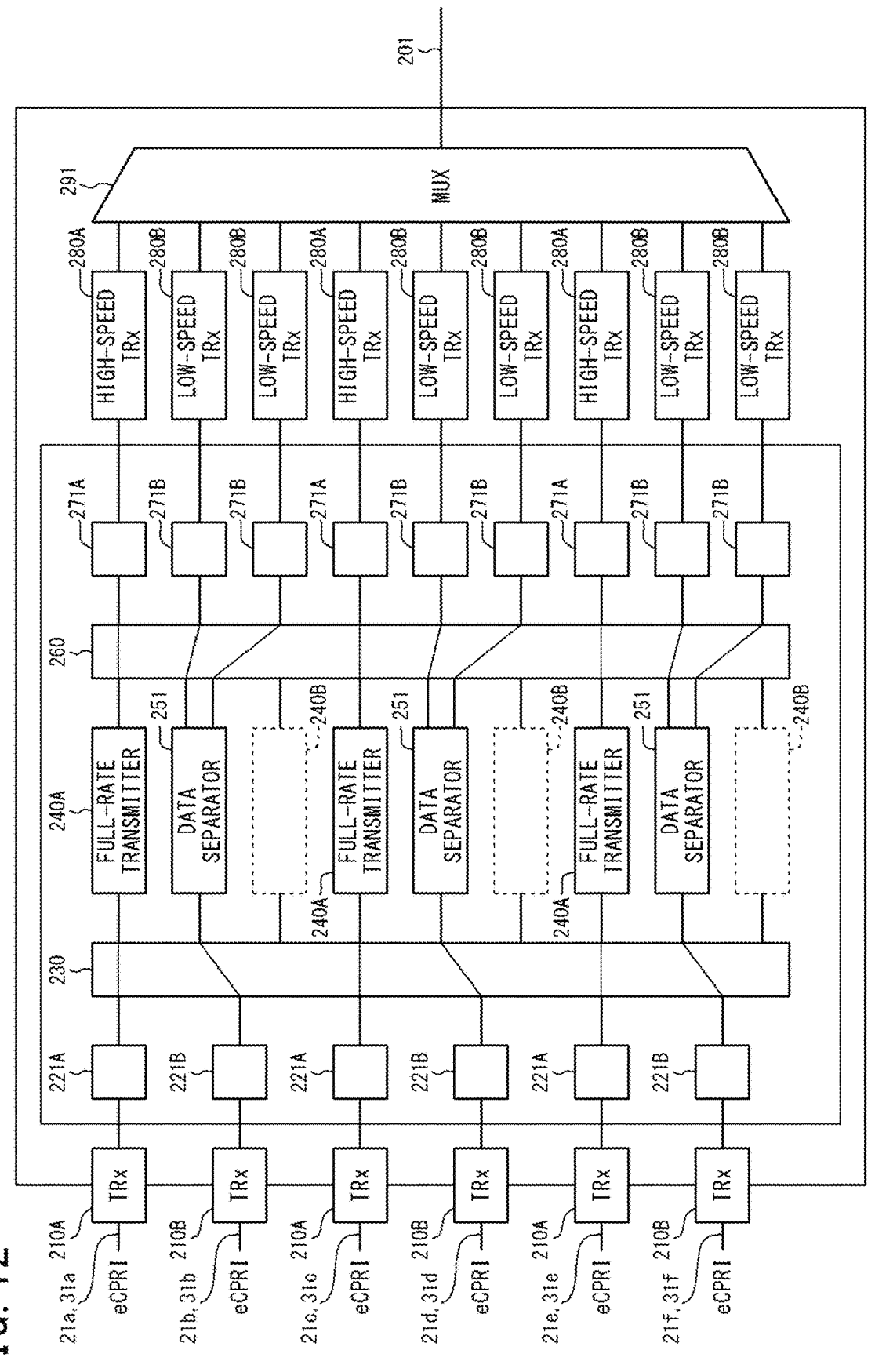
FIG. 12 shows an example of setting of the WDM concentrator in the case where all the six original signals are eCPRI signals.

FIG. 12 shows an example of setting of the WDM concentrator 200 in the case where all the six original signals are eCPRI signals. In the transmission device, in the first switching unit 230, the serial/parallel converters 221A are connected to the full-rate transmission units 240A, and the serial/parallel converters 221B are connected to the data separators 251. In the second switching unit 260, the full-rate transmission units 240A are connected to the parallel/serial converters 271A, and each of the data separators 251 is connected to two parallel/serial converters 271B. Three full-rate transmission units 240B are invalidated as unused blocks. Although FIG. 12 shows the setting of the WDM concentrator 200 serving as a transmission device, the setting of the WDM concentrator 200 serving as a reception device is the same as that shown in FIG. 12. In the reception device, in the first switching unit 230, the parallel/serial converters 222A are connected to the full-rate transmission units 240A, and the parallel/serial converters 222B are connected to the data couplers 252. In the second switching unit 260, the full-rate transmission units 240A are connected to the serial/parallel converters 272A, and each of the data couplers 252 is connected to two serial/parallel converters 272B. Three full-rate transmission units 240B are invalidated as unused blocks.

The above setting is used when both the first base station and the second base station are 5G base stations. That is, in FIG. 1, each of the optical fiber cables 21*a*, 21*c*, 21*e*, 31*a*, 31*c*, 31*e* transmits an eCPRI signal, and each of the optical fiber cables 21*b*, 21*d*, 21*f*, 31*b*, 31*d*, 31*f* transmits an eCPRI signal.

[7. Modifications]

[7-1. First Modification]

In detecting FEC blocks, reproduction data may be subjected to FEC decoding to detect a boundary of FEC blocks. Each of the boundary detector 312 and the boundary detectors 322*a*, 322*b* executes FEC decoding to detect a boundary of FEC blocks.

[7-2. Second Modification]

As described above, when two channels of low-rate signals are transmitted 40 km with a wavelength difference of 20 nm, a differential delay of 17.3 ns at maximum is caused by fiber dispersion. Meanwhile, an eCPRI signal cannot be accurately restored unless FEC blocks are read out from the queues 324*a*, 324*b* in correct order, and at appropriate timings. Therefore, in this modification, for example, when FEC codes having a short code length are used, an initialization signal is used in order to absorb a differential delay between the low-rate signals and cause synchronization of FEC block readout timings between the channels.

Figure 13:
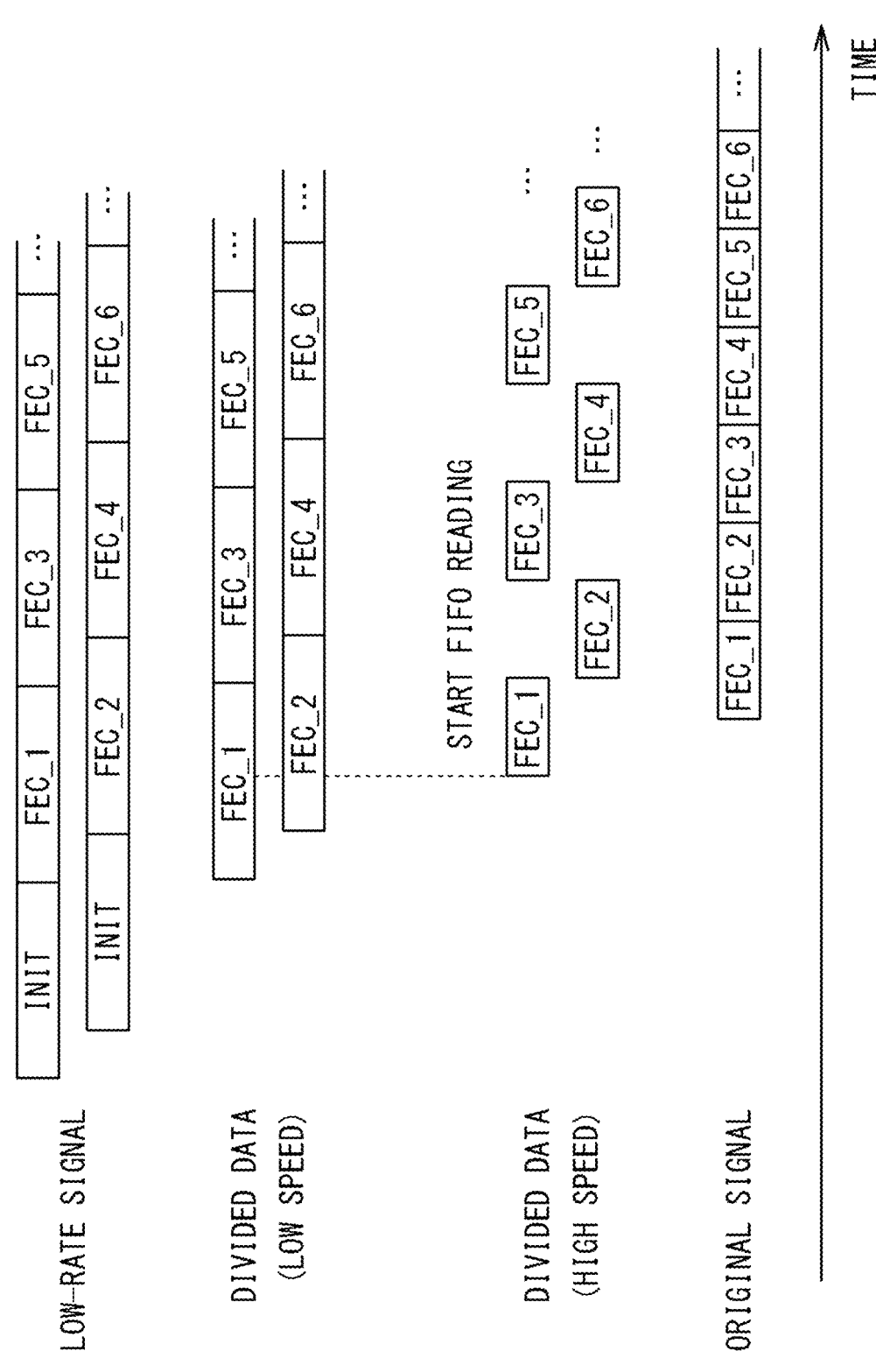
FIG. 13 is a timing chart showing a second modification of the signal processing by the WDM concentrator serving as a reception device according to the embodiment.

FIG. 13 is a timing chart showing a second modification of the signal processing by the WDM concentrator 200 serving as a reception device, according to the present embodiment. The WDM concentrator 200 as a transmission device (counter device) adds initialization blocks (initialization signals) to the heads of the low-rate signals, and transmits the low-rate optical signals. An initialization block is a block including information that is distinguishable from FEC blocks including actual data. The initialization block has a block length defined in advance. The reception device receives two channels of low-rate optical signals to which the initialization blocks are added. The two channels of low-rate optical signals are respectively received by two low-speed optical transceivers 280B, are converted to low-rate signals being serial electric signals, and are given to two serial/parallel converters 272B.

The two serial/parallel converters 272B each convert the initialization block and the low-rate signal from a serial signal to a parallel signal.

The boundary detectors 322*a*, 322*b* each read out the initialization block to execute an initialization process. In the initialization process, an end of the initialization block, i.e., a boundary between the initialization block and the first FEC block, is detected. The block length of the initialization block is used for detecting the boundary. That is, upon starting data reception, the boundary detector 322a, 322b determines that the end of the initialization block is present at the end of the known block length of the initialization block. After the end of the initialization block, boundaries of FEC blocks are repeated every 5280 bits (the block length of each FEC block). Therefore, the end of the initialization block being detected allows detection of the boundaries of the following FEC blocks.

The writing unit 323 starts writing of the first FEC block (FEC_1) in the queue 324a without writing the initialization blocks in the queues 324a, 324b. On or after a time point when the writing unit 323 has written a half of FEC_1, i.e., 2640 bits, in the queue 324a, the writing unit 323 notifies the reading unit 325 of initialization completion. The writing unit 323 writes, alternately in the two queues 324a, 324b, the FEC blocks (divided data) being parallel data in the order of FEC_1, FEC_2, FEC_3, FEC_4, . . . .

Upon receiving the notification of initialization completion, the reading unit 325 starts reading of FEC_1 from the queue 324a. The writing speed of the FEC blocks into the queue 324a by the writing unit 323 is 12.9 Gbps, and the readout speed of the FEC blocks from the queue 324a by the reading unit 325 is 25.8 Gbps. As described above, since the initialization completion is notified on or after the time point when the half of FEC_1, i.e., 2640 bits, has been written in the queue 324a, the readout of FEC_1 by the reading unit 325 does not overtake the writing of FEC_1 by the writing unit 323. The reading unit 325 sequentially reads out the FEC blocks from each of the two queues 324a, 324b at a 25.8 Gbps clock rate.

The reading unit 325 combines the read FEC blocks to restore an eCPRI signal (original signal) being a parallel signal at a 25.8 Gbps clock rate. The reading unit 325 gives the restored eCPRI signal to the parallel/serial converter 222B. The parallel/serial converter 222B converts the parallel signal to a serial signal, and outputs the converted eCPRI signal to the optical transceiver 210B. The optical transceiver 210B converts the eCPRI signal being an electric signal to an optical signal, and outputs the optical signal.

[8. Other Modifications]

Blocks having a uniquely defined number of bits (N) may be used instead of RS-FEC blocks. In a specific example, a synchronization header of 2 bits (e.g., "00" or "11") may be added for every N bits.

In the above embodiment, the full-rate transmission units 240A, 240B, the data separators 251, and the data couplers 252 are implemented by a hardware logic circuit. However, the present disclosure is not limited thereto. For example, the full-rate transmission units 240A, 240B, the data separators 251, and the data couplers 252 may be implemented by a CPU (Central Processing Unit). That is, the CPU may execute a computer program to realize the functions of the full-rate transmission units 240A, 240B, the data separators 251, and the data couplers 252.

[9. Effects]

The relay system 100 relays communication between the RRH 20 (first device) and the BBU 30 (second device). The relay system 100 includes the WDM concentrator 200 (transmission device), and the WDM concentrator 200 (reception device). The WDM concentrator 200 serving as the transmission device receives an original signal transmitted from the RRH 20, and transmits an optical signal according to the received original signal. The WDM concentrator 200 serving as the reception device receives the optical signal, and transmits an original signal restored based on the received optical signal, to the BBU 30. The original signal includes at least one of an eCPRI signal (first signal) subjected to error correction coding, and a CPRI signal (second signal) not subjected to error correction coding and having a lower speed than the eCPRI signal.

The WDM concentrator 200 serving as the transmission device includes the optical transceiver 210A (first receiver) and 210B (second receiver), the full-rate transmission unit 240A (first full-rate transmission unit), the full-rate transmission unit 240B (second full-rate transmission unit), the data separator 251, the high-speed optical transceiver 280A (first optical transmitter), the plurality of low-speed optical transceivers 280B (second optical transmitter), the first switching unit 230, the second switching unit 260, and the multiplexer 291. The optical transceivers 210A, 210B each receive the original signal transmitted from the RRH 20. The full-rate transmission unit 240A outputs the original signal without changing the transmission speed of the original signal. The full-rate transmission unit 240B outputs the CPRI signal without changing the transmission speed of the CPRI signal. The data separator 251 converts the eCPRI signal to a plurality of low-rate signals having a lower speed than the eCPRI signal. The high-speed optical transceiver 280A converts the eCPRI signal to a first optical signal having a transmission speed equal to that of the eCPRI signal, and transmits the first optical signal. The plurality of low-speed optical transceivers 280B each convert the low-rate signal or the CPRI signal to an optical signal having a lower speed than the eCPRI signal, and transmit the optical signal. The first switching unit 230 is capable of switching connection between any of the optical transceivers 210A, 210B, and any of the full-rate transmission unit 240A, the full-rate transmission unit 240B, and the data separators 251. The second switching unit 260 is capable of switching connection between any of the full-rate transmission unit 240A, the full-rate transmission unit 240B, and the data separators 251, and any of the high-speed optical transceiver 280A and the plurality of low-speed optical transceivers 280B. The multiplexer 291 multiplexes a plurality of optical signals transmitted from the high-speed optical transceiver 280A and the plurality of low-speed optical transceivers 280B, and transmits a multiplexed optical signal.

The WDM concentrator 200 serving as the reception device includes the demultiplexer 292, the high-speed optical transceiver 280A (first optical receiver), the plurality of low-speed optical transceivers 280B (second optical receivers), the full-rate transmission unit 240A (third full-rate transmission unit), the full-rate transmission unit 240B (fourth full-rate transmission unit), the data coupler 252, the optical transceivers 210A (first transmitter) and 210B (second transmitter), the second switching unit 260 (third switching unit), and the first switching unit 230 (fourth switching unit). The demultiplexer 292 receives the multiplexed optical signal, and converts the received multiplexed optical signal to a plurality of optical signals. The high-speed optical transceiver 280A converts the first optical signal generated by the demultiplexer 292 to an eCPRI signal. The low-speed optical transceiver 280B converts an optical signal having a lower speed than the first optical signal generated by the demultiplexer 292, to a low-rate signal or a CPRI signal. The full-rate transmission unit 240A outputs the original signal without changing the transmission speed of the original signal. The full-rate transmission unit 240B outputs the CPRI signal without changing the transmission speed of the CPRI signal. The data coupler 252 restores an eCPRI signal, based on a plurality of low-rate signals. The optical transceivers 210A, 210B each transmit the original signal to the BBU 30. The second switching unit 260 is capable of switching connection between any of the high-speed optical transceiver 280A and the plurality of low-speed optical transceivers 280B, and any of the full-rate transmission unit 240A, the full-rate transmission unit 240B, and the data coupler 252. The first switching unit 230 is capable of switching connection between any of the full-rate transmission unit 240A, the full-rate transmission unit 240B, and the data coupler 252, and any of the optical transceivers 210A, 210B.

In the case where the original signal received by the optical transceiver 210A of the transmission device is an eCPRI signal and the original signal received by the optical transceiver 210B of the transmission device is an eCPRI signal, the first switching unit 230 of the transmission device connects the optical transceiver 210A to the full-rate transmission unit 240A, and connects the optical transceiver 210B to the data separators 251. The second switching unit 260 of the transmission device connects the full-rate transmission unit 240A to the high-speed optical transceiver 280A, and connects the data separator 251 to the low-speed optical transceiver 280B. The second switching unit 260 of the reception device connects the high-speed optical transceiver 280A to the full-rate transmission unit 240A, and connects the low-speed optical transceiver 280B to the data coupler 252. The first switching unit 230 of the reception device connects the full-rate transmission unit 240A to the optical transceiver 210A, and connects the data coupler 252 to the optical transceiver 210B.

In the case where the original signal received by the optical transceiver 210A of the transmission device is an eCPRI signal and the original signal received by the optical transceiver 210B of the transmission device is a CPRI signal, the first switching unit 230 of the transmission device connects the optical transceiver 210A to the full-rate transmission unit 240A, and connects the optical transceiver 210B to the full-rate transmission unit 240B. The second switching unit 260 of the transmission device connects the full-rate transmission unit 240A to the high-speed optical transceiver 280A, and connects the full-rate transmission unit 240B to the low-speed optical transceiver 280B. The second switching unit 260 of the reception device connects the high-speed optical transceiver 280A to the full-rate transmission unit 240A, and connects the low-speed optical transceiver 280B to the full-rate transmission unit 240B. The first switching unit 230 of the reception device connects the full-rate transmission unit 240A to the optical transceiver 210A, and connects the full-rate transmission unit 240B to the optical transceiver 210B.

In the case where the original signal received by the optical transceiver 210A of the transmission device is a CPRI signal and the original signal received by the optical transceiver 210B is a CPRI signal, the first switching unit 230 of the transmission device connects the optical transceiver 210A to the full-rate transmission unit 240A, and connects the optical transceiver 210B to the full-rate transmission unit 240B. The second switching unit 260 of the transmission device connects the full-rate transmission unit 240A to one optical transceiver out of the high-speed optical transceiver 280A and the plurality of low-speed optical transceivers 280B, and connects the full-rate transmission unit 240B to another optical transceiver out of the high-speed optical transceiver 280A and the plurality of low-speed optical transceivers 280B. The second switching unit 260 of the reception device connects one optical transceiver out of the high-speed optical transceiver 280A and the plurality of low-speed optical transceivers 280B of the reception device to the full-rate transmission unit 240A, and connects another optical transceiver out of the high-speed optical transceiver 280A and the plurality of low-speed optical transceivers 280B of the reception device to the full-rate transmission unit 240B. The first switching unit 230 of the reception device connects the full-rate transmission unit 240A to the optical transceiver 210A, and connects the full-rate transmission unit 240B to the optical transceiver 210B.

Thus, the WDM concentrator 200 serving as the transmission device converts the eCPRI signal to the first optical signal, converts the eCPRI signal to a plurality of low-rate optical signals, converts the CPRI signal to the second optical signal, and multiplexes the plurality of converted optical signals to transmit a multiplexed optical signal. The WDM concentrator 200 serving as the reception device receives the multiplexed optical signal, restores the first optical signal to an eCPRI signal, restores the plurality of low-rate signals to an eCPRI signal, and restores the second optical signal to a CPRI signal. Therefore, it is possible to cope with multiple rates in the mobile communication network.

In the case where the original signal received by the optical transceiver 210A of the transmission device is a CPRI signal and the original signal received by the optical transceiver 210B is a CPRI signal, the second switching unit 260 of the transmission device may connect the full-rate transmission unit 240A to one low-speed optical transceiver 280B, and may connect the full-rate transmission unit 240B to another low-speed optical transceiver 280B. The second switching unit 260 of the reception device may connect one low-speed optical transceiver 280B to the full-rate transmission unit 240A, and may connect another low-speed optical transceiver 280B to the full-rate transmission unit 240B. Therefore, in the case where the low-speed CPRI signal is received by each of the optical transceivers 210A and 210B of the transmission device, the CPRI signals can be efficiently transmitted optically.

The full-rate transmission unit 240A of the transmission device may output the original signal in synchronization with the output timing of the data separator 251 of the transmission device. The full-rate transmission unit 240A of the reception device may output the original signal in synchronization with the output timing of the data coupler 252 of the reception device. In this case, since the output timing of the original signal from the full-rate transmission unit 240A of the transmission device coincides with the output timing of the low-rate signal from the data separator 251 of the transmission device, multiplexing of the optical signals is facilitated. Since the output timing of the original signal from the full-rate transmission unit 240A of the reception device coincides with the output timing of the data coupler 252 of the reception device, the restored original signal is outputted at an appropriate timing.

The full-rate transmission unit 240A of the transmission device may detect a boundary of a plurality of blocks included in the original signal, and may output the blocks after holding the blocks during a delay time for synchronization with the output timing of the data separator 251. The full-rate transmission unit 240A of the reception device may detect a boundary of a plurality of blocks included in the original signal, and may output the blocks after holding the blocks during a delay time for synchronization with the output timing of the data coupler 252. This allows synchronization of the output timings of the full-rate transmission unit 240A and the data separator 251 of the transmission device, and synchronization of the output timings of the full-rate transmission unit 240A and the data coupler 252 of the reception device.

In the case where the original signal received by the optical transceiver 210B of the transmission device is an eCPRI signal, the full-rate transmission unit 240B of the transmission device may be invalidated. In the case where the original signal received by the optical transceiver 210B of the transmission device is a CPRI signal, the data separator 251 of the transmission device may be invalidated. Thus, unused units in the transmission device can be invalidated according to the original signal received by the optical transceiver 210B of the transmission device.

In the case where the original signal received by the optical transceiver 210B of the transmission device is an eCPRI signal, the low-speed optical transceiver 280B of the reception device may convert the optical signal to a low-rate signal, and the full-rate transmission unit 240B of the reception device may be invalidated. In the case where the original signal received by the optical transceiver 210B of the transmission device is a CPRI signal, the low-speed optical transceiver 280B of the reception device may convert the optical signal to a CPRI signal, and the data coupler 252 of the reception device may be invalidated. Thus, unused units in the reception device can be invalidated according to the original signal received by the optical transceiver 210B of the transmission device.

A switching method for switching setting of the WDM concentrator 200 as a transmission device includes a first step and a second step. In the first step, the first switching unit 230 is operated to switch connection between any of the optical transceivers 210A, 210B, and any of the full-rate transmission units 240A, 240B and the data separator 251. In the second step, the second switching unit 260 is operated to switch connection between any of the full-rate transmission units 240A, 240B, and the data separators 251, and any of the high-speed optical transceiver 280A and the low-speed optical transceiver 280B. Thus, regardless of which is given as the original signal, the eCPRI signal or the CPRI signal, the given signal can be converted to an appropriate optical signal and transmitted, by appropriately setting the first switching unit 230 and the second switching unit 260.

A switching method for switching setting of the WDM concentrator 200 as a reception device includes a first step and a second step. In the second step, the second switching unit 260 is operated to switch connection between any of the high-speed optical transceiver 280A and the low-speed optical transceiver 280B, and any of the full-rate transmission units 240A, 240B and the data coupler 252. In the first step, the first switching unit 230 is operated to switch connection between any of the optical transceivers 210A, 210B, and any of the full-rate transmission units 240A, 240B and the data coupler 252. Thus, regardless of which of the first optical signal, the second optical signal, and the low-rate optical signal is transmitted from the WDM concentrator 200 as the transmission device, the transmitted signal can be restored to an appropriate original signal by appropriately setting the second switching unit 260 and the first switching unit 230.

[10. Additional Note]

The embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST

10 communication system
20 RRH (first device)
30 BBU (second device)
21, 31, 201 optical fiber cable
100 relay system
200, 200A, 200B WDM concentrator (transmission device, reception device)
210A, 210B optical transceiver (receiver, transmitter, TRx)
221A, 221B serial/parallel converter
222A, 222B parallel/serial converter
230 first switching unit (fourth switching unit)
240, 240A, 240B full-rate transmission unit (first full-rate transmission unit, second full-rate transmission unit)
251 data separator
252 data coupler
260 second switching unit (third switching unit)
271A, 271B parallel/serial converter
272A, 272B serial/parallel converter
280A high-speed optical transceiver (first optical transmitter, first optical receiver, high-speed TRx)
280B low-speed optical transceiver (second optical transmitter, second optical receiver, low-speed TRx)
291 multiplexer
292 demultiplexer
312, 322a, 322b boundary detector
313, 323, 413 writing unit
314a, 314b, 324a, 324b, 414 queue
315, 325, 415 reading unit

The invention claimed is:

1. A relay system that relays communication between a first device and a second device, comprising:

a transmission device configured to receive an original signal transmitted from the first device, and transmit an optical signal according to the received original signal; and a reception device configured to receive the optical signal transmitted from the transmission device, and transmit, to the second device, a restored signal corresponding to the original signal that is restored based on the received optical signal, the original signal including at least one of a first signal and a second signal having a lower speed than the first signal, the transmission device comprising:

a first receiver and a second receiver each configured to receive a copy of the original signal transmitted from the first device;

a first full-rate transmitter configured to output one of the copies of the original signal without changing a transmission speed thereof;

a second full-rate transmitter configured to output the second signal received as part of the original signal without changing a transmission speed of the second signal;

a data separator configured to convert the first signal received as part of the original signal to a plurality of low-rate signals having a lower speed than the first signal;

a first optical transmitter configured to convert the first signal to a first optical signal having a transmission speed equal to that of the first signal, and transmit the first optical signal;

a plurality of second optical transmitters each configured to convert the low-rate signal or the second signal to an optical signal having a lower speed than the first optical signal, and transmit the optical signal;

a first switch to switch connection among any of the first receiver and the second receiver, and any of the first full-rate transmitter, the second full-rate transmitter, and the data separator;

a second switch to switch connection among any of the first full-rate transmitter, the second full-rate transmitter, and the data separator, and any of the first optical transmitter and the plurality of second optical transmitters; and a multiplexer configured to multiplex a plurality of optical signals transmitted from the first optical transmitter and the plurality of second optical transmitters, and transmit a multiplexed optical signal, the reception device comprising:

a demultiplexer configured to receive the multiplexed optical signal transmitted by the multiplexer, and convert the received multiplexed optical signal to the plurality of optical signals, a first optical receiver configured to convert the first optical signal generated by the demultiplexer to the first signal;

a plurality of second optical receivers configured to convert an optical signal having a lower speed than the first optical signal generated by the demultiplexer to the low-rate signal or the second signal;

a third full-rate transmitter configured to output the restored signal corresponding to the original signal at the transmission speed of the original signal;

a fourth full-rate transmitter configured to output the second signal without changing the transmission speed of the second signal;

a data coupler configured to restore the first signal, based on the plurality of low-rate signals;

a first transmitter and a second transmitter each configured to transmit the restored signal corresponding to the original signal to the second device;

a third switch to switch connection among any of the first optical receiver and the plurality of second optical receivers, and any of the third full-rate transmitter, the fourth full-rate transmitter, and the data coupler, and a fourth switch to switch connection among any of the third full-rate transmitter, the fourth full-rate transmitter, and the data coupler, and any of the first transmitter and the second transmitter, wherein in a case where the copy of the original signal received by the first receiver of the transmission device is the first signal, and the copy of the original signal received by the second receiver of the transmission device is the first signal, the first switch connects the first receiver to the first full-rate transmitter, and connects the second receiver to the data separator, the second switch connects the first full-rate transmitter to the first optical transmitter, and connects the data separator to the second optical transmitter, the third switch connects the first optical receiver to the third full-rate transmitter, and connects the second optical receiver to the data coupler, and the fourth switch connects the third full-rate transmitter to the first transmitter, and connects the data coupler to the second transmitter, in a case where the copy of the original signal received by the first receiver of the transmission device is the first signal, and the copy of the original signal received by the second receiver of the transmission device is the second signal, the first switch connects the first receiver to the first full-rate transmitter, and connects the second receiver to the second full-rate transmitter, the second switch connects the first full-rate transmitter to the first optical transmitter, and connects the second full-rate transmitter to the second optical transmitter, the third switch connects the first optical receiver to the third full-rate transmitter, and connects the second optical receiver to the fourth full-rate transmitter, and the fourth switch connects the third full-rate transmitter to the first transmitter, and connects the fourth full-rate transmitter to the second transmitter, and in a case where the copy of the original signal received by the first receiver of the transmission device is the second signal, and the copy of the original signal received by the second receiver of the transmission device is the second signal, the first switch connects the first receiver to the first full-rate transmitter, and connects the second receiver to the second full-rate transmitter, the second switch connects the first full-rate transmitter to one optical transmitter out of the first optical transmitter and the plurality of second optical transmitters, and connects the second full-rate transmitter to another optical transmitter out of the first optical transmitter and the plurality of second optical transmitters, the third switch connects one optical receiver out of the first optical receiver and the plurality of second optical receivers, to the third full-rate transmitter, and connects another optical receiver out of the first optical receiver and the plurality of second optical receivers, to the fourth full-rate transmitter, and the fourth switch connects the third full-rate transmitter to the first transmitter, and connects the fourth full-rate transmitter to the second transmitter.

2. The relay system according to claim 1, wherein in a case where the copy of the original signal received by the first receiver of the transmission device is the second signal, and the copy of the original signal received by the second receiver of the transmission device is the second signal, the second switch connects the first full-rate transmitter to one of the second optical transmitters, and connects the second full-rate transmitter to another one of the second optical transmitters, and the third switch connects one of the second optical receivers to the second full-rate transmitter, and connects another one of the second optical receivers to the fourth full-rate transmitter.

3. The relay system according to claim 1, wherein the first full-rate transmitter outputs the one of the copies of the original signal in synchronization with an output timing of the data separator, and the third full-rate transmitter outputs the restored signal corresponding to the original signal in synchronization with an output timing of the data coupler.

4. The relay system according to claim 1, wherein the first signal is subjected to error correction coding, and the second signal is not subjected to error correction coding, the first full-rate transmitter detects a boundary of a plurality of blocks included in the one of the copies of the original signal, and outputs the blocks after holding the blocks during a delay time for synchronization with the output timing of the data separator, and the third full-rate transmitter detects a boundary of the plurality of blocks included in the restored signal corresponding to the original signal, and outputs the blocks after holding the blocks during a delay time for synchronization with the output timing of the data coupler.

5. The relay system according to claim 1, wherein in the case where the copy of the original signal received by the second receiver of the transmission device is the first signal, the second full-rate transmitter is invalidated, and in the case where the copy of the original signal received by the second receiver of the transmission device is the second signal, the data separator is invalidated.

6. The relay system according to claim 1, wherein in the case where the copy of the original signal received by the second receiver of the transmission device is the first signal, the fourth full-rate transmitter is invalidated, and in the case where the copy of the original signal received by the second receiver of the transmission device is the second signal, the data coupler is invalidated.

7. A switching method for switching setting of the transmission device according to claim 1, the method comprising:

operating the first switch to switch connection among any of the first receiver and the second receiver, and any of the first full-rate transmitter, the second full-rate transmitter, and the data separator; and operating the second switch to switch connection among any of the first full-rate transmitter, the second full-rate transmitter, and the data separator, and any of the first optical transmitter and the second optical transmitter.

8. A switching method for switching setting of the reception device according to claim 1, the method comprising:

operating the third switch to switch connection among any of the first optical receiver and the second optical receiver, and any of the third full-rate transmitter, the fourth full-rate transmitter, and the data coupler; and operating the fourth switch to switch connection among any of the third full-rate transmitter, the fourth full-rate transmitter, and the data coupler, and any of the first transmitter and the second transmitter.

9. A transmission device that receives an original signal from a first device, and transmits an optical signal according to the received original signal, the original signal including at least one of a first signal and a second signal having a lower speed than the first signal, the transmission device comprising:

a first receiver and a second receiver each configured to receive a copy of the original signal transmitted from the first device;

a first full-rate transmitter configured to output one of the copies the original signal without changing a transmission speed thereof;

a second full-rate transmitter configured to output the second signal received as part of the original signal without changing a transmission speed of the second signal;

a data separator configured to convert the first signal received as part of the original signal to a plurality of low-rate signals having a lower speed than the first signal;

a first optical transmitter configured to convert the first signal to a first optical signal having a transmission speed equal to that of the first signal, and transmit the first optical signal;

a plurality of second optical transmitters each configured to convert the low-rate signal or the second signal to an optical signal having a lower speed than the first optical signal, and transmit the optical signal;

a first switch to switch connection among any of the first receiver and the second receiver, and any of the first full-rate transmitter, the second full-rate transmitter, and the data separator;

a second switch to switch connection among any of the first full-rate transmitter, the second full-rate transmitter, and the data separator, and any of the first optical transmitter and the second optical transmitters; and a multiplexer configured to multiplex a plurality of optical signals transmitted from the first optical transmitter and the plurality of second optical transmitters, and transmit a multiplexed optical signal, wherein in a case where the copy of the original signal received by the first receiver is the first signal, and the copy of the original signal received by the second receiver is the first signal, the first switch connects the first receiver to the first full-rate transmitter, and connects the second receiver to the data separator, and the second switch connects the first full-rate transmitter to the first optical transmitter, and connects the data separator to the second optical transmitter, in a case where the copy of the original signal received by the first receiver is the first signal, and the copy of the original signal received by the second receiver is the second signal, the first switch connects the first receiver to the first full-rate transmitter, and connects the second receiver to the second full-rate transmitter, and the second switch connects the first full-rate transmitter to the first optical transmitter, and connects the second full-rate transmitter to the second optical transmitter, and in a case where the copy of the original signal received by the first receiver is the second signal, and the copy of the original signal received by the second receiver is the second signal, the first switch connects the first receiver to the first full-rate transmitter, and connects the second receiver to the second full-rate transmitter, and the second switch connects the first full-rate transmitter to one optical transmitter out of the first optical transmitter and the plurality of second optical transmitters, and connects the second full-rate transmitter to another optical transmitter out of the first optical transmitter and the plurality of second optical transmitters.

10. A reception device that receives a multiplexed optical signal generated based on an original signal including at least one of a first signal and a second signal having a lower speed than the first signal, and transmits, to a second device, a restored signal corresponding to the original signal restored based on the received multiplexed optical signal, the reception device comprising:

a demultiplexer configured to receive the multiplexed optical signal, and convert the received multiplexed optical signal to a plurality of optical signals;

a first optical receiver configured to convert the first optical signal generated by the demultiplexer to the first signal;

a plurality of second optical receivers configured to convert an optical signal having a lower speed than the first optical signal generated by the demultiplexer to the low-rate signal or the second signal;

a third full-rate transmitter configured to output the restored signal corresponding to the original signal without changing the transmission speed of the original signal;

a fourth full-rate transmitter configured to output the second signal without changing the transmission speed of the second signal;

a data coupler configured to restore the first signal, based on the plurality of low-rate signals;

a first transmitter and a second transmitter each configured to transmit the restored signal corresponding to the original signal to the second device;

a third switch to switch connection among any of the first optical receiver and the second optical receivers, and any of the third full-rate transmitter, the fourth full-rate transmitter, and the data coupler; and a fourth switch to switch connection between any of the third full-rate transmitter, the fourth full-rate transmitter, and the data coupler, and any of the first transmitter and the second transmitter, wherein in a case where an optical signal received by the first optical receiver is the first optical signal, and an optical signal received by the second optical receiver is a low-rate optical signal obtained by converting the low-rate signal, the third switch connects the first optical receiver to the third full-rate transmitter, and connects the second optical receiver to the data coupler, and the fourth switch connects the third full-rate transmitter to the first transmitter, and connects the data coupler to the second transmitter, in a case where the optical signal received by the first optical receiver is the first optical signal, and the optical signal received by the second optical receiver is a second optical signal obtained by converting the second signal, the third switch connects the first optical receiver to the third full-rate transmitter, and connects the second optical receiver to the fourth full-rate transmitter, and the fourth switch connects the third full-rate transmitter to the first transmitter, and connects the fourth full-rate transmitter to the second transmitter, and in a case where the optical signal received by the first optical receiver is the second optical signal, and the optical signal received by the second optical receiver is the second optical signal, the third switch connects one optical receiver out of the first optical receiver and the plurality of second optical receivers, to the third full-rate transmitter, and connects another optical receiver out of the first optical receiver and the plurality of second optical receivers, to the fourth full-rate transmitter, and the fourth switch connects the third full-rate transmitter to the first transmitter, and connects the fourth full-rate transmitter to the second transmitter.

* * * * *